(12) United States Patent
Oh et al.

(10) Patent No.: US 7,555,910 B2
(45) Date of Patent: Jul. 7, 2009

(54) REFRIGERATOR

(75) Inventors: Seung Jin Oh, Daegu (KR); Ik Kyu Lee, Changwon (KR); Chan Kyoo Jang, Changwon (KR); Ki Cheol Woo, Masan (KR)

(73) Assignee: LG Electronics Inc., Seoul (KR)

( * ) Notice: Subject to any disclaimer, the term of this patent is extended or adjusted under 35 U.S.C. 154(b) by 472 days.

(21) Appl. No.: 10/578,709

(22) PCT Filed: Nov. 12, 2004

(86) PCT No.: PCT/KR2004/002925

§ 371 (c)(1),
(2), (4) Date: May 10, 2006

(87) PCT Pub. No.: WO2005/047786

PCT Pub. Date: May 26, 2005

(65) Prior Publication Data

US 2007/0086151 A1    Apr. 19, 2007

(30) Foreign Application Priority Data

| Nov. 14, 2003 | (KR) | 10-2003-0080766 |
| Nov. 14, 2003 | (KR) | 10-2003-0080768 |
| Nov. 19, 2003 | (KR) | 10-2003-0082389 |
| Dec. 5, 2003 | (KR) | 10-2003-0088234 |
| Dec. 5, 2003 | (KR) | 10-2003-0088243 |
| Dec. 11, 2003 | (KR) | 10-2003-0090402 |
| Dec. 11, 2003 | (KR) | 10-2003-0090404 |

(51) Int. Cl.
*F25B 49/00* (2006.01)
*G01K 13/00* (2006.01)
*F25D 23/12* (2006.01)

(52) U.S. Cl. .............................. 62/126; 62/129; 62/331; 248/917

(58) Field of Classification Search .................. 62/126, 62/129, 331; 248/917, 229.1, 201
See application file for complete search history.

(56) References Cited

U.S. PATENT DOCUMENTS

| 4,814,759 | A | * | 3/1989 | Gombrich et al. ............. 345/60 |
| 5,719,645 | A | * | 2/1998 | Saito et al. .................. 348/818 |
| 6,134,906 | A | * | 10/2000 | Eastman ...................... 62/331 |
| 6,483,695 | B1 | * | 11/2002 | Hartstein .................... 361/680 |

(Continued)

FOREIGN PATENT DOCUMENTS

JP    2000-274923    10/2000

(Continued)

*Primary Examiner*—William C Doerrier
(74) *Attorney, Agent, or Firm*—Ked & Associates LLP

(57) ABSTRACT

A refrigerator is provided in which a communication pad is installed in one of the doors to open and close storage spaces formed in a refrigerator main body. The communication pad is detachably installed in a seating space of the door. While an upper end of the communication pad is seated in the seating space by an upper clamp, a lower end of the communication pad is seated in the seating space by a lower clamp. The upper clamp and the lower clamp are installed in the seating space through hinge assemblies. The hinge assemblies are configured so that the upper and lower clamps rotate only by a force of a predetermined value or higher. With such structure, die communication pad may be securely mounted to and easily dismounted from the door.

21 Claims, 26 Drawing Sheets

U.S. PATENT DOCUMENTS

| | | | |
|---|---|---|---|
| 6,559,829 B1 * | 5/2003 | Matsuo et al. | 345/156 |
| 6,682,161 B2 * | 1/2004 | Yun | 312/405 |
| 6,927,871 B1 * | 8/2005 | Silverbrook et al. | 358/1.15 |
| 2001/0025497 A1 * | 10/2001 | Roh et al. | 62/125 |

FOREIGN PATENT DOCUMENTS

| | | |
|---|---|---|
| KR | 2000-0015414 | 3/2000 |
| KR | 20-0328248 | 9/2003 |
| KR | 2004-0069636 | 8/2004 |
| KR | 2004-0080076 | 9/2004 |

* cited by examiner

US 7,555,910 B2

REFRIGERATOR

TECHNICAL FIELD

The present invention relates to a refrigerator, and more particularly, to a refrigerator with a communication pad.

BACKGROUND ART

A refrigerator is capable of keeping stored goods fresh for a long time by maintaining a storage space at a constant temperature. In addition to such a function of keeping the stored goods, a variety of functions are added to the refrigerator.

One of them is to mount a communication pad to a front surface of a refrigerator door. The communication pad makes it possible for the refrigerator to communicate with a user or external devices through the Internet. As an example of such a communication pad, there is a tabulate computer. An LCD panel with a touch screen function may be used.

FIG. 1 shows a conventional refrigerator with a communication pad. According to the prior art, a main body 10 in which storage spaces are formed is mounted with doors 11 and 13 for opening and closing the storage spaces, respectively. The doors 11 and 13 are supported by hinges h and h' as centers of rotation at upper and lower portions of both side ends of a front surface of the main body 10, thus opening and closing the storage spaces. Reference numerals 11' and 13' designate door handles. The doors 11 and 13 operate so that portions thereof in which the door handles 11' and 13' are mounted come into close contact with or get separated from the front surface of the main body 10 with the hinges h and h' as the center.

Next, a front surface of the door 11 is provided with a dispenser 15 for taking out and using water or ice from the storage space without opening the door 11. A front surface of the door 13 is provided with a communication pad 17. The communication pad 17 can communicate with a controller 19 provided on an upper surface of the main body 10.

In the meantime, FIG. 2 shows a conventional communication pad mounting structure. According to the prior art, a seating space 14 is concavely formed in a portion of the front surface of the door 13. The seating space 14 is formed with its front face opened to the front of the door 13. A pair of through-holes 14a are formed in a bottom surface of the seating space 14.

A clamp 20 and a holder 30 are provided on upper and lower ends of the seating space 14 in order to fix the communication pad 17 into the seating space 14, respectively. The clamp 20 is formed to enclose a portion of an upper front surface, an upper surface and a portion of a rear surface of the communication pad 17 and is formed with a laterally extending insertion groove 21. An upper end of the communication pad 17 is seated into the insertion groove 21. A catching portion 23 is defined by the front end of the clamp 20 and supports the upper end of the front surface of the communication pad 17.

The clamp 20 is installed in the seating space 14 to be rotatable about a hinge shaft 25 by a predetermined angle. The clamp 20 is subjected to an elastic force from a torsion spring 29 installed around the hinge shaft 25. The torsion spring 29 prevents the clamp 20 to rotate inadvertently, and thus keeps the communication pad 17 seated in the seating space 14. Here, the torsion spring 29 exerts the elastic force onto the clamp 20 counterclockwise with respect to the figure.

The holder 30 is formed to enclose a portion of a lower front surface, a lower surface and a portion of the rear surface of the communication pad 17 and is formed with a laterally extending insertion groove 31. A lower end of the communication pad 17 is seated into the insertion groove 31.

Insertion legs 33, which pass through the through-holes 14a and are positioned in a lower portion of the seating space 14, are provided in a bottom surface of the holder 30. Each insertion leg 33 is formed so that a front to rear width thereof is relatively smaller than that of the through-hole 14a. Thus, the holder 30 may rotate in and out of the seating space 14 by a predetermined angle about the portions of the holder 30 that pass through the through-holes 14a. A distal end of the insertion leg 33 is formed to have a front to rear width which is relatively larger than that of the through-hole 14a. It is for the purpose of preventing the insertion legs 33 from removing through the through-holes 14a inadvertently.

A connector 37 is provided on the center of the bottom surface of the seating space 14. The connector 37 protrudes substantially vertically upward from the bottom surface of the seating space 14, and is positioned in the insertion groove 31 through an opening 34 formed in the bottom surface of the holder 30. A connector 39 to be engaged with the connector 37 is provided on the lower surface of the communication pad 17. The connector 39 is designed not to protrude from the lower surface of the communication pad 17.

Here, a process of mounting the communication pad 17 in the seating space 14 will be described. First, an upper end of the holder 30 rotates to slantingly protrude out of the seating space 14, and the lower end of the communication pad 17 is seated into the insertion groove 31 of the holder 30.

Then, by rotating the clamp 20 about the hinge pin 25 for a portion of the clamp 20 to protrude out of the seating space 14, the upper end of the communication pad 17 is positioned in the insertion groove 21. Of course, the communication pad 17 is still in a state where its upper end protrudes to the front face of the seating space 14 further than its lower end. In such a state, when the upper end of the communication pad 17 is pushed into the seating space 14, the communication pad 17 enters the seating space 14, and the clamp 20 also enters the seating space 14 by a restoring force of the torsion spring 29. Of course, at this time, the connector 39 of the communication pad 17 is inserted into the connector 37, thus electrically connecting them to each other.

However, the aforementioned conventional refrigerator has the following problems.

First, in order to mount the communication pad 17 into the seating space 14, while operating the clamp 20 by one hand, gripping the communication pad 17 by the other hand and keeping it seated in the insertion groove 31 of the holder 30, a user should push the communication pad 17 into the seating space 14. Thus, there is a problem in that it is cumbersome and difficult to insert the communication pad 17 into the seating space 14.

In general, one of the doors 11 and 13 is mounted with the dispenser 15, and the other one thereof is provided with a home-bar door for opening and closing a home-bar. However, there is a design problem in that any one of the dispenser 15 and the home-bar cannot be applied to the refrigerator in order to install the communication pad 17.

In the conventional refrigerator, the communication pad 17 is supported in the mounting seating 14 only by the elastic force of the torsion spring 29. Therefore, there is a problem in that the communication pad 17 is removed from the mounting seating 14 when an impact is applied to the door 13 as large as the elastic force of the torsion spring 29 is overcome.

It is possible to dismount the communication pad 17 from the door 13. Therefore, with the communication pad 17 separated from the door 13, it may occur that the communication pad 17 is lost. Particularly, if the communication pad 17 is at a place in which it is not in sight, it is very difficult to find it.

In the meantime, when the communication pad 17 is dismounted from the mounting seating 14, the connector 37 is in an exposed state. Particularly, since the connector 37 is exposed upward from the bottom surface of the seating space 14, there is a problem in that the connector 37 is electrically affected in a wet kitchen environment.

DISCLOSURE OF INVENTION

Technical Problem

The present invention is conceived to solve the aforementioned problems in the prior art. Accordingly, an object of the present invention is to make it easy to mount and dismount a communication pad.

Another object of the present invention is to add a maximum variety of functions to a refrigerator.

A further object of the present invention is to more securely mount a communication pad to a door of a refrigerator.

A still further object of the present invention is to make it easy to find a communication pad separated from a refrigerator door.

A still further object of the present invention is to prevent a configuration for electrical connection with a communication pad from being electrically affected by foreign matter.

Technical Solution

According to an aspect of the present invention for achieving the objects, there is provided a refrigerator, comprising: a seating space with an open front face provided at one side of a door; a communication pad detachably seated in the seating space; a pair of clamps installed on upper and lower ends of the seating space to be pivotable back and forth and supporting the communication pad in the seating space by enclosing upper and lower ends of the communication pad; and hinge assemblies fixing the clamps in the seating space and causing the clamps to rotate only by a force of a predetermined value or higher. In a process of mounting and dismounting the communication pad to and from the seating space, the respective clamps simultaneously pivot in opposite directions to each other by the communication pad.

Front ends of the respective clamps may be provided with catching portions for supporting upper and lower ends of a front surface of the communication pad. Portions opposite to the respective catching portions may be provided with supporting portions for supporting upper and lower ends of a rear surface of the communication pad. The catching portions and the supporting portions may cooperate with each other so that the clamps are formed with insertion grooves in which the upper and lower ends of the communication pad are seated.

The supporting portions of the clamps may be formed to be relatively longer than the catching portions, and thus, come into contact with the rear surface of the communication pad when the communication pad is mounted and dismounted.

The respective hinge assemblies may be configured so that respective hinge members with ends connected to the clamps and the door are rotatably connected to hinge shafts. The hinge members may rotate relative to the hinge shafts when the force of the predetermined value or higher is applied to the hinge members.

According to another aspect of the present invention, there is provided a refrigerator, comprising: a seating space with an open front face formed at ons side of a door; a communication pad detachably seated in the seating space; a clamp installed to an upper end of the seating space to be pivotable back and forth through a hinge assembly and supporting an upper end of the communication pad; a holder provided in a lower end of the seating space and supporting a lower end of the communication pad by allowing it to be inserted in the holder; and a locking means for preventing the communication pad from being dismounted from the seating space.

A front end of the clamp may be provided with a catching portion for supporting upper and lower ends of a front surface of the communication pad. A portion opposite to the catching portion may be provided with a supporting portion for supporting upper and lower ends of a rear surface of the communication pad. The catching portion and the supporting portion may cooperate with each other so that an insertion groove, in which the upper and lower ends of the communication pad are seated, is formed in the clamp.

The supporting portion of the clamp may be formed to be relatively longer than the catching portion, and thus, come into contact with the rear surface of the communication pad when the communication pad is mounted and dismounted.

The door may be a home-bar door provided in a door for opening and closing a storage space in a refrigerator main body. The home-bar door may be installed so that an upper end thereof is vertically pivotable on a lower end thereof.

The locking means may comprise a locking bar provided in a rear surface of the clamp, protruding rearward, and having a catching groove at a front end of the locking bar; a slot formed in the home-bar door to be inclined at a predetermined angle, the front end of the locking bar being selectively inserted into the slot; and a locking ball installed to move along the slot and preventing the clamp from rotating by allowing the locking ball to move according to the rotational angle of the home-bar door and to be seated in the catching groove.

The locking bar may be formed so that the front end thereof is inclined to the rearward of the home-bar door at a predetermined angle. The slot may be formed so that an upper end thereof is inclined to the forward of the home-bar door at a predetermined angle.

The locking means may comprise a housing including an installation space therein; a stopper including a protruding portion formed in an end of a catching portion and a catching portion installed in the installation space, and preventing the clamp from operating by allowing the protruding portion to selectively protrude out of the housing and to be positioned on a rotational trace of the clamp; an elastic member installed in the installation space of the housing and exerting an elastic force in a direction of protrusion of the protruding portion of the stopper out of the housing; and an operating knob installed to be exposed out of the door, connected to the stopper, operated by a user, and actuating the stopper.

The door may be a home-bar door which is provided in a door for opening and closing a storage space in a refrigerator main body. The home-bar door may be installed so that an upper end thereof is vertically pivotable on a lower end thereof.

According to a further aspect of the present invention, there is provided a refrigerator, comprising: a seating space with an open front face formed at one side of a door; a communication pad detachably seated in the seating space; an upper holder provided on an upper end of the seating space and supporting an upper end of the communication pad; and a lower holder provided on a lower end of the seating space and supporting a lower end of the communication pad. At least one of the upper and lower holders is installed to be vertically movable in a height direction of the communication pad.

The upper holder may be supported by an elastic member, which exerts an elastic force in a direction of the upper end of the communication pad.

The elastic member may be provided between a ceiling of the seating space and an upper surface of the upper holder and covered with a cover.

The refrigerator may further comprise a fixing means fixing the communication pad mounted in the seating space to the seating space; a password input portion receiving a password for releasing the fixing means; a password recognition portion storing a previously registered password and comparing the password received through the password input portion with the previously registered password; and a release operating portion causing the fixing means to be released if the password recognition portion determines that the registered password and the received password are identical to each other.

The fixing means may comprise a solenoid with a plunger capable of moving inward and outward.

The fixing means may comprise a magnet switch selectively generating a magnetic force by means of power on or off.

The refrigerator may further comprise a radio call signal generator provided in a main body side including the door and generating a radio call signal by user's input; a radio call signal receiver provided in the communication pad and receiving the radio call signal; a ring tone generator provided in the communication pad and generating a ring tone when the radio call signal is received in the radio call signal receiver; and a speaker provided in the communication pad and outputting the ring tone generated in the ring tone generator.

In a connector installed in the seating space to be exposed and including a plurality of terminals, all terminals except one in the connector may be provided with a switch. The switch may be turned on by allowing a connector provided in the communication pad to be inserted in the connector installed in the seating space, thus effecting an electrically connection between the door side and the communication pad.

The terminal without the switch among the terminals of the connector installed in the seating space to be exposed may include an end connected to the switch and the other end selectively connected to one of terminals of the connector provided in the communication pad.

Advantageous Effects

According to the present invention constructed as above, it is easy to mount and dismount a communication pad and possible to add a variety of functions, such as a dispenser, a home-bar and a communication pad, to a refrigerator and to securely mount a communication pad to a door or a home-bar door.

In addition, according to the present invention, it is possible to easily find a communication pad which is separated from a door and to prevent a connector from being electrically affected by foreign matter when the connector is exposed to the outside due to the separation of the communication pad.

BEST MODE FOR CARRYING OUT THE INVENTION

Figure 1:
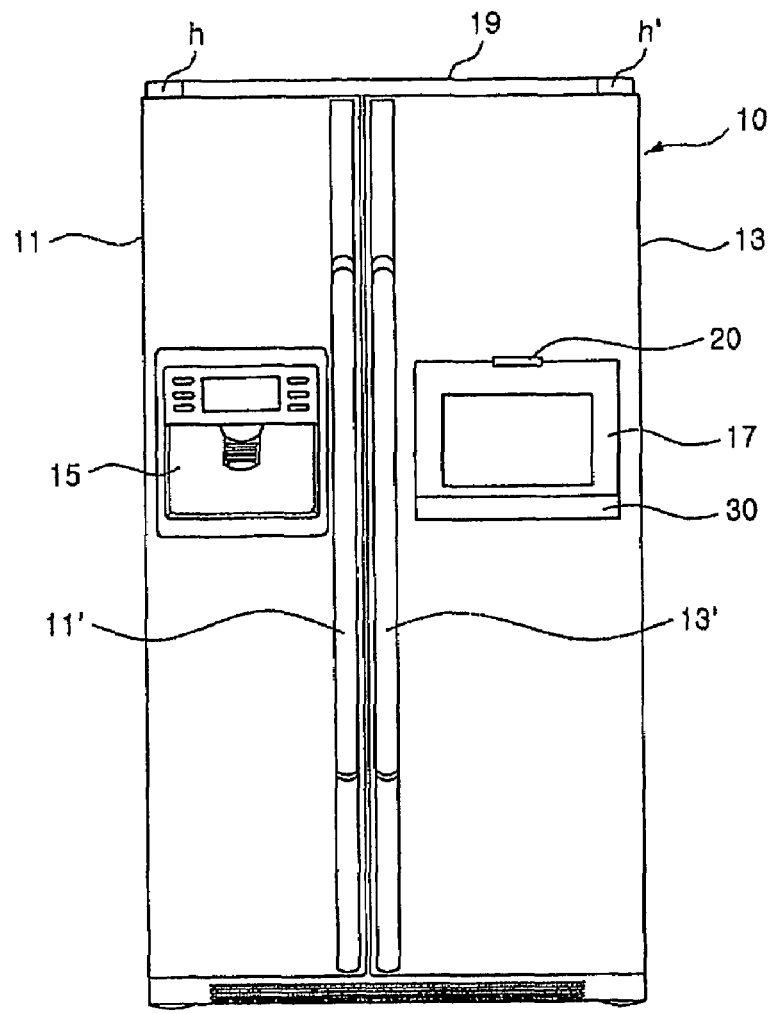
FIG. 1 is a front view showing a front surface of a conventional refrigerator with a communication pad.
Figure 2:
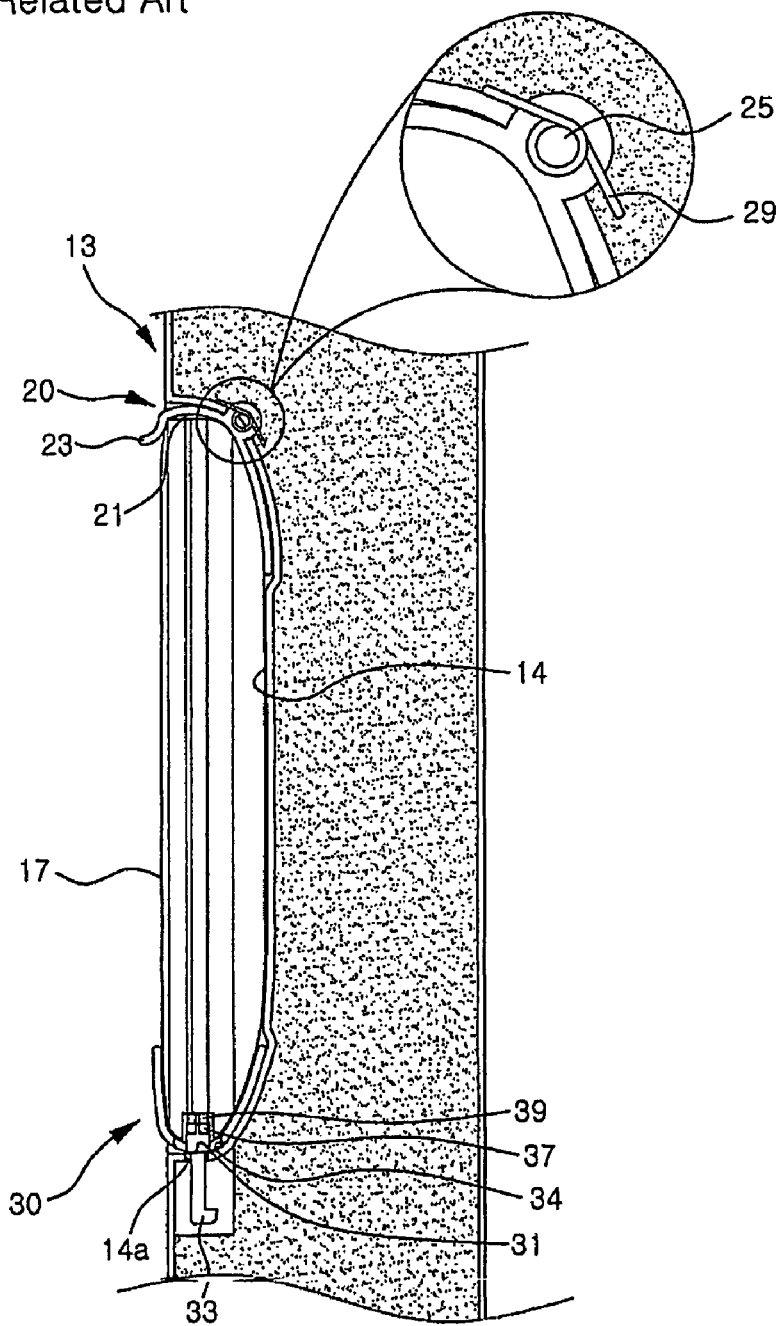
FIG. 2 is a sectional view showing a conventional communication pad mounting structure.
Figure 3:
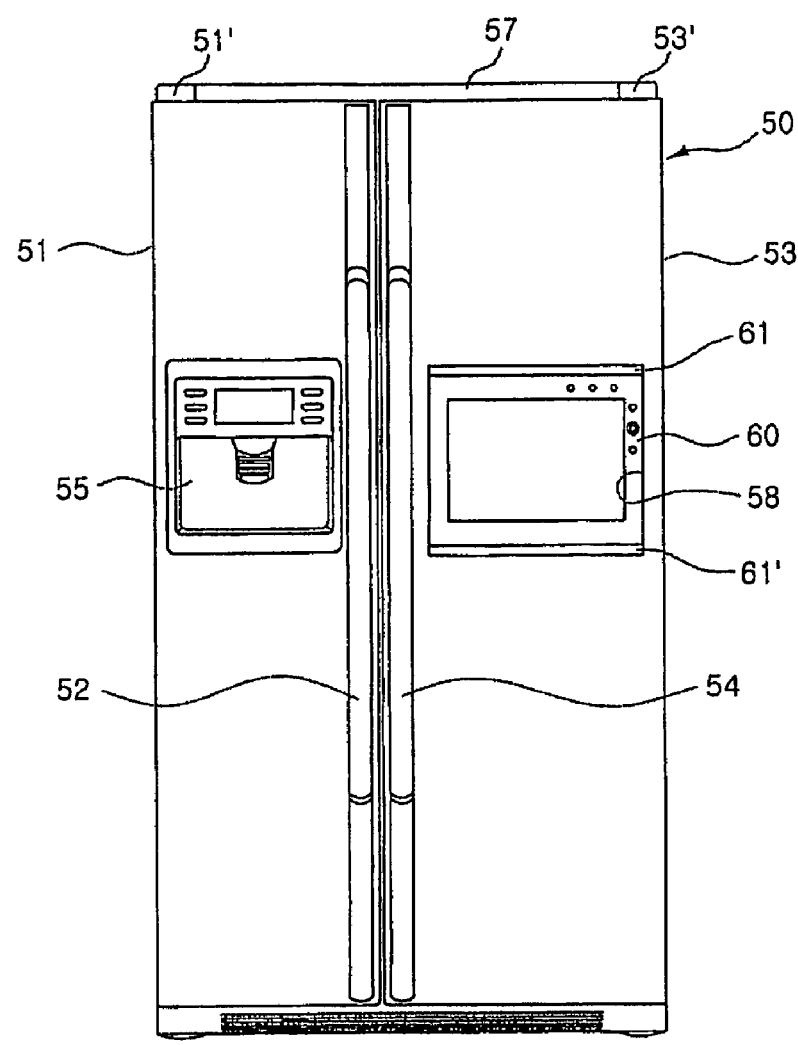
FIG. 3 is a front view showing a first embodiment of a refrigerator according to the present invention.
Figure 4:
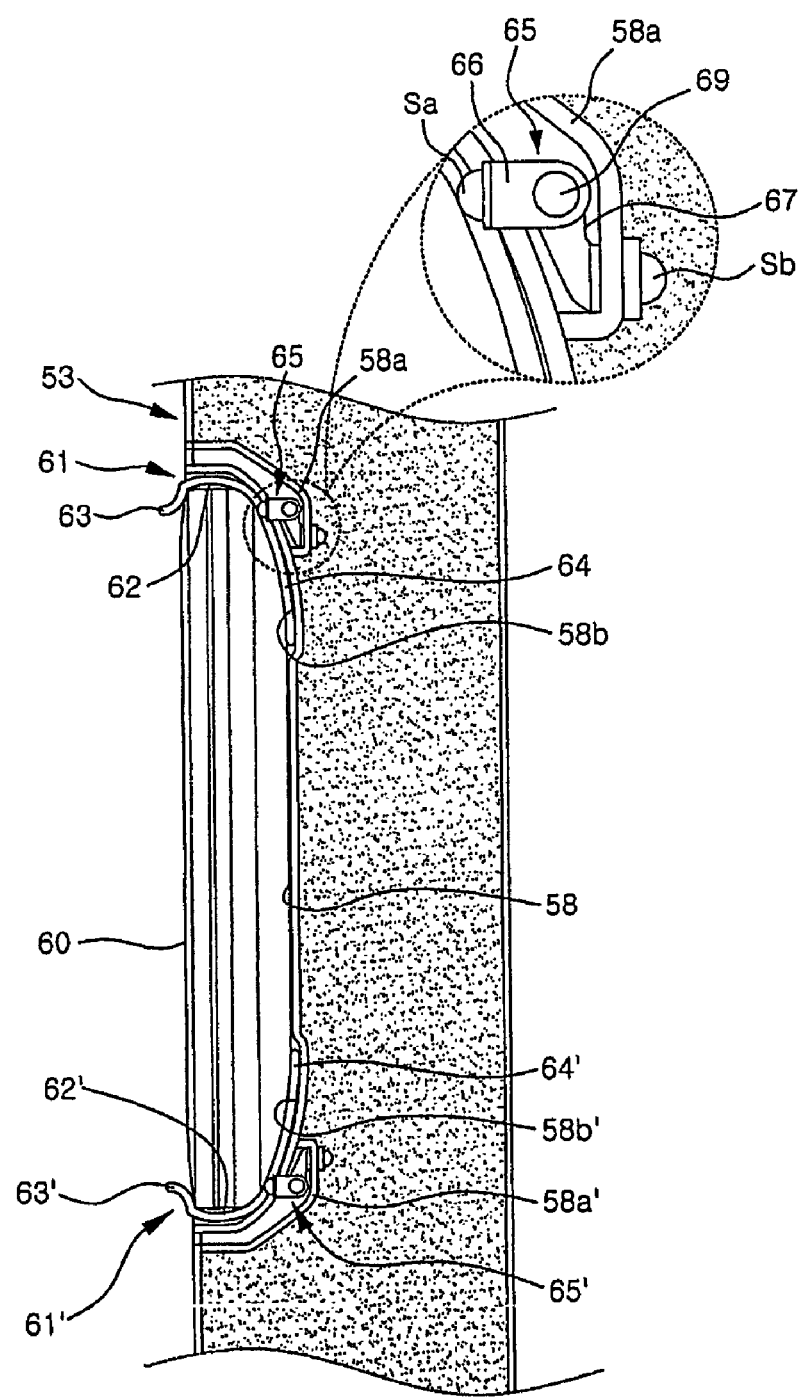
FIG. 4 is a sectional view showing the first embodiment of the present invention.

A first embodiment of the present invention is disclosed in FIGS. 3 and 4. According thereto, a main body 50 of a refrigerator is mounted with a pair of doors 51 and 53. The doors 51 and 53 are mounted on the main body 50 to be pivotable on hinges 51' and 53', which are provided on upper and lower portions of both side ends of a front surface of the main body 50. The doors 51 and 53 serve to selectively open and close storage spaces (not shown) provided in the main body 50.

The doors 51 and 53 are provided with door handles 52 and 54 which are gripped by a user in order to rotate the doors 51 and 53, respectively. In addition, a front surface of the door 51 of the doors 51 and 53 is provided with a dispenser 55 for discharging water or ice out of the main body 50.

A front surface of the door 53 of the doors 51 and 53 is mounted with a communication pad 60. As the communication pad 60, it is possible to use a tablet computer comprising a touch screen for displaying a variety of information on the Internet and the operation of the refrigerator and for receiving operating signals and a central processing unit capable of processing a variety of signals. In addition, the communication pad 60 is detachably mounted to the door 53, and males it possible to communicate with a controller 57, which is provided on an upper surface of the main body 50, by wire or wireless.

Next, a structure for mounting the communication pad 60 to the door 53 will be described. The door 53 is provided with a predetermined seating space 58. The seating space 58, in which the communication pad 60 is seated, is formed by concavely depressing a portion of the front surface of the door 53.

Upper and lower clamps 61 and 61' are installed on upper and lower ends of the seating space 58, respectively. The clamps 61 and 61' are for the purpose of supporting upper and lower ends of the communication pad 60, respectively. In the present embodiment, each of the clamps 61 and 61' is formed to have a lateral width corresponding to that of the communication pad 60. Insertion grooves 62 and 62', in which the upper and lower ends of the communication pad 60 are seated, are formed to laterally extend in the clamps 61 and 61', which are configured to cover portions of the upper and lower ends of the communication pad 60. The clamps 61 and 61' are installed at upper and lower ends of the seating space 58 to face the insertion grooves 62 and 62' to each other.

Front ends of the clamps 61 and 61' are provided with catching portions 63 and 63', which extend downward and upward to be inclined at a predetermined angle with respect to a front surface of the communication pad 60 in order to support the upper and lower ends of the front surface of the communication pad 60 seated in the insertion grooves 62 and 62', respectively.

The other ends of the clamps 61 and 61' corresponding to the catching portions 63 and 63' are provided with supporting portions 64 and 64', respectively. The supporting portions 64 and 64' are formed to be relatively longer than the catching portions 63 and 63'. The supporting portions 64 and 64' serve to support a rear surface of the communication pad 60. The catching portions 63 and 63' and the supporting portions 64 and 64' define both sidewalls of the insertion grooves 62 and 62'.

The clamps 61 and 61' are installed at the upper and lower ends of the seating space 58 with hinge assemblies 65 and 65' so as to pivot back and forth by a predetermined angle. Each of the hinge assemblies 65 and 65' comprises a pair of hinge members 66 and 67 and a hinge shaft 69 rotatably connecting the hinge members 66 and 67 to each other. The hinge members 66 and 67 are fixed to a rear surface of each of the clamps 61 and 61' and each of fixing frames 58a and 58a' integrally provided in the door 53 by screws Sa and Sb, respectively.

The hinge members 66 and 67 connected through the hinge shaft 69 pivot on the hinge shaft 69 only when an external force of a predetermined value or higher is applied to the hinge members 66 and 67. That is, the hinge members 66 and 67 rotate only when the user causes the clamps 61 and 61' to rotate with a force of a predetermined value or higher while the communication pad 60 is supported by the clamps 61 and 61' and then seated in the seating space 58, whereas the hinge members 66 and 67 do not rotate inadvertently by the deadweight of the communication pad 60 or an impact caused from the rotation of the door 53.

In the meantime, the upper and lower portions of the rear surface of the seating space 58 are formed with contact grooves 58b and 58b' corresponding to the supporting portions 64 and 64' of the clamps 61 and 61' in a shape and size, respectively. Thus, when the communication pad 60 is seated in the seating space 58, the supporting portions 64 and 64' come into close contact with the contact grooves 58b and 58b', so that the supporting portions 64 and 64' do not protrude from an inner surface of the seating space 58 and thus cause no gap between the communication pad 60 and the seating space 58.

Hereinafter, the operation of the first embodiment of the present invention constructed as above will be described.

Figure 5:
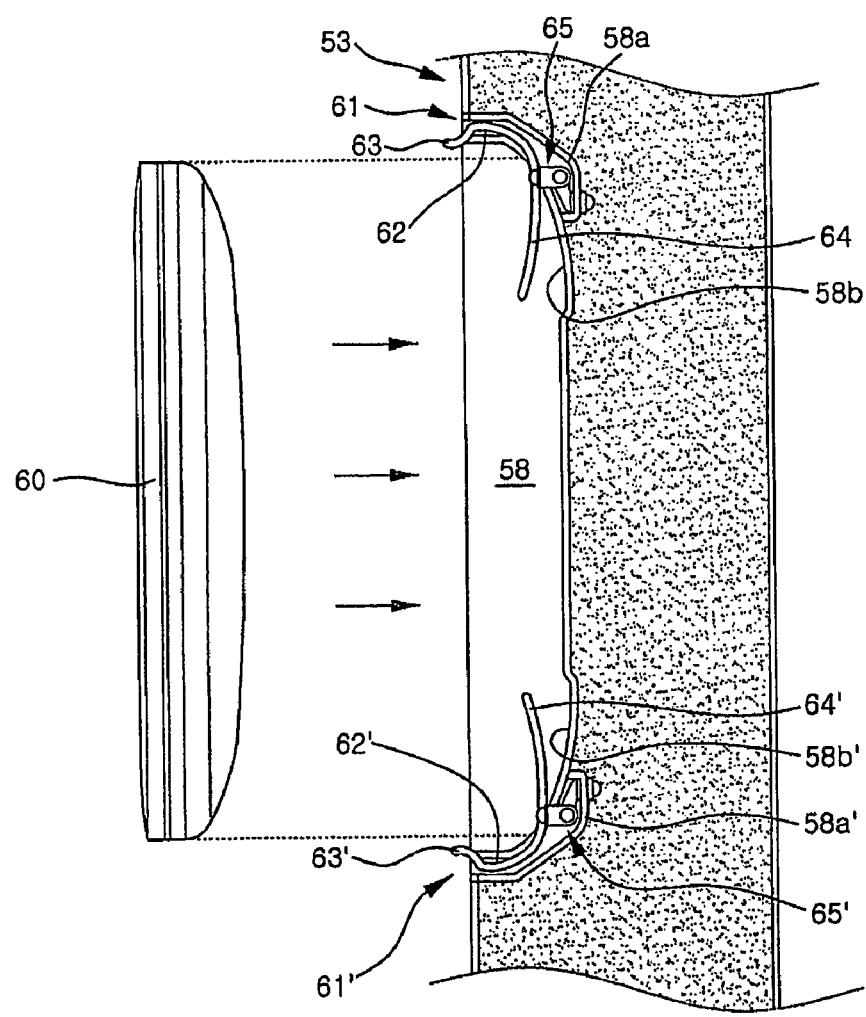
FIGS. 5 and 6 are views showing the operation of the first embodiment of the present invention.
Figure 6:
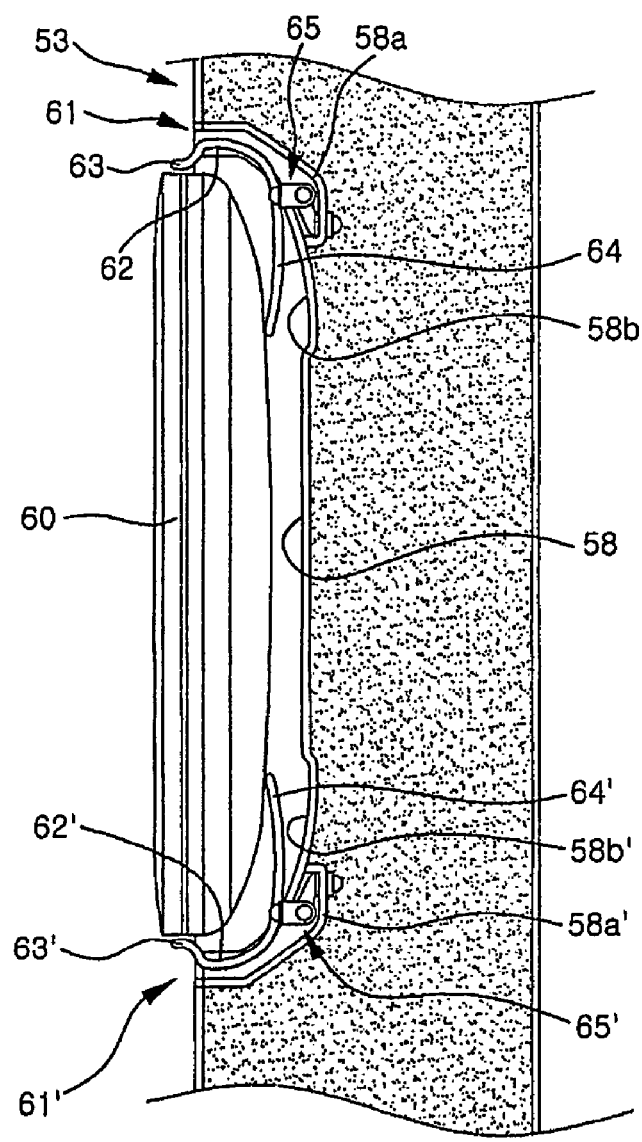

FIGS. 5 and 6 show the operation of the first embodiment. First, as shown in FIG. 5, the communication pad 60 is positioned in front of the seating space 58 of the door 53. Of course, the upper and lower clamps 61 and 61' have been previously caused to pivot toward the front of the seating space 58 at a predetermined angle. At this time, the catching portions 63 and 63' of the upper and lower clamps 61 and 61' are positioned above and below traces along which the upper and lower ends of the communication pad 60 move, respectively.

In such a state, the communication pad 60 is seated in the seating space 58 by moving the communication pad 60 to the right side in the figure. Here, the upper and lower ends of the communication pad 60 are seated in the insertion grooves 62 and 62' of the clamps 61 and 61' and simultaneously push the supporting portions 64 and 64' of the clamps 61 and 61' rearward, so that the upper and lower clamps 61 and 61' are pushed by the communication pad 60 and rotate counterclockwise and clockwise in FIG. 6, respectively.

The rotation of the clamps 61 and 61' causes the supporting portions 64 and 64' to come into close contact with interiors of the contact grooves 58b and 58b' of the seating space 58. In addition, the catching portions 63 and 63' of the upper and lower clamps 61 and 61' move downward and upward and support the upper and lower portions of the front surface of the communication pad 60 seated in the seating space 58, respectively.

In the meantime, in order to dismount the communication pad 60 so seated in the seating space 58 from the seating space 58, the catching portion 63 of the upper clamp 61 or the catching portion 63' of the lower clamp 61' is gripped by hand and caused to rotate clockwise or counterclockwise. If the upper clamp 61 or the lower clamp 61' rotates as above, the supporting portions 64 and 64' are spaced apart from the interiors of the contact grooves 58b and 58b', respectively, and push the rear surface of the communication pad 60 to the left side in FIG. 5b.

Accordingly, the communication pad 60 is dismounted from the seating space 58. In addition, the rotation of the clamps 61 and 61' cause the catching portions 63 and 63' to move upward and downward and to be positioned above and below the traces along which the upper and lower ends of the communication pad 60 move, respectively, so that the dismounting of the communication pad 60 is not obstructed.

Figure 7:
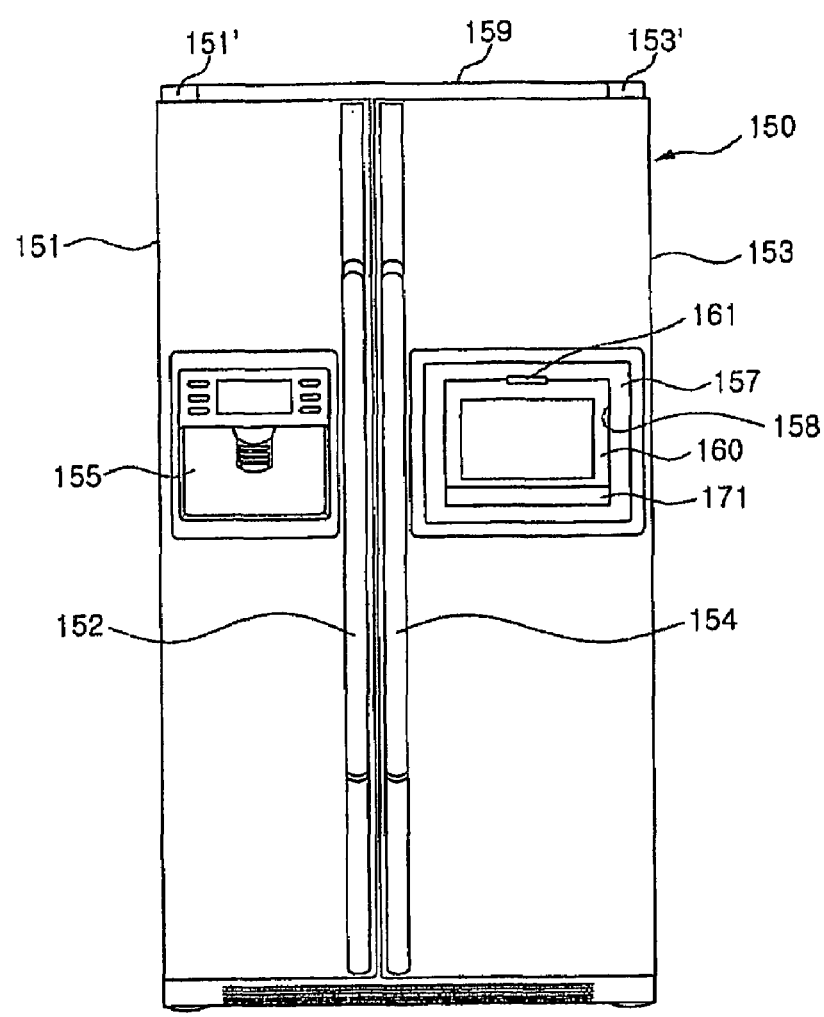
FIG. 7 is a front view showing a second embodiment of the present invention.

Now, a second embodiment of the present invention will be described with reference to FIGS. 7 and 8. As shown in the figures, a pair of doors 151 and 153 are installed on a front surface of a main body 150 in which storage spaces are formed. The doors 151 and 153 are mounted rotatably about hinges 151' and 153', which are provided on upper and lower portions of both side ends of the main body 150, and thus serve to selectively open and close the storage spaces provided in the main body 150.

The doors 151 and 153 are provided with door handles 152 and 154 which are gripped by a user for rotating the doors 151 and 153, respectively. In addition, a front surface of the door 151 of the doors 151 and 153 is provided with a dispenser 155 for supplying water or ice to the outside thereof.

In the meantime, a home-bar 156 is provided in the door 153 of the doors 151 and 153. Drinking water bottles and the like are accommodated in the home-bar 156, and the door 153 is mounted with a home-bar door 157. An upper end of the home-bar door 157 rotates about a lower end thereof, so that the home-bar 156 is selectively opened and closed.

Then, the home-bar door 157 is mounted with a communication pad 160. As the communication pad 160, a tablet computer may be used. The communication pad 160 is detachably mounted to the home-bar door 157 and electrically connected to a controller 159, which is provided on an upper surface of the main body 150, by wire or wireless.

Figure 8:
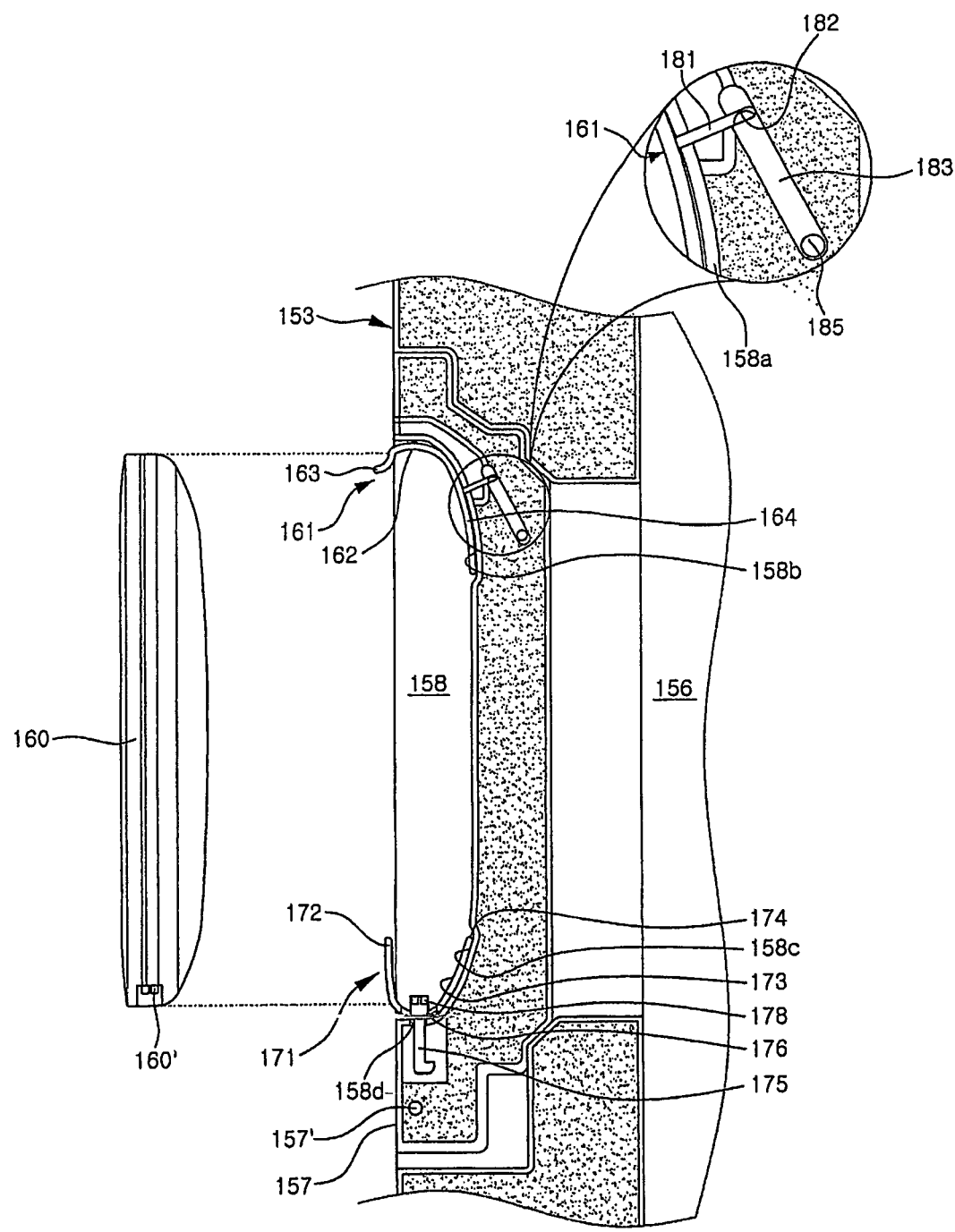
FIG. 8 is a sectional view showing the second embodiment of the present invention.

In the meantime, as shown in FIG. 8, the home-bar door 157 is provided with a predetermined seating space 158. The seating space 158 is formed with a front surface opened by concavely depressing a portion of the home-bar door 157, and the communication pad 160 is seated in the seating space 158.

A clamp 161 and a holder 171 are installed in upper and lower ends of the seating space 158, respectively. The clamp 161, which supports an upper end of the communication pad 160, is formed with an insertion groove 162 in which at least a portion of the upper end of the communication pad 160, for example, an intermediate portion of the upper end of the communication pad 160 is seated. The insertion groove 162 is formed to laterally extend in the clamp 161. A lateral length of the clamp 161 is shorter than that of the communication pad 160 in FIG. 6, but it is not necessarily to do so.

A front end of the clamp 161 is provided with a catching portion 163 which extends with a predetermined downward and upward inclination in order to support a front surface of the upper end of the communication pad 160 seated in the insertion groove 162. An end of the clamp 161 corresponding to the catching portion 163 is provided with a supporting portion 164. The supporting portion 164 is formed to extend relatively longer than the catching portion 163. The supporting portion 164 serves to support a rear surface of the communication pad 160. The catching portion 163 and the supporting portion 164 define both sidewalls of the insertion groove 162. In addition, the clamp 161 is connected to an upper end of the seating space 158 through a hinge assembly as in the first embodiment, and thus, is installed to be pivotable back and forth.

The holder 171, which supports a lower end of the communication pad 160, is formed to have a lateral width corresponding to that of the communication pad 160. The holder 171 is formed with an insertion groove 173, which extends laterally and is opened upward in order to insert the lower end of the communication pad 160 into the insertion groove 173. An insertion leg 175 is provided in a bottom surface of the holder 171.

The insertion leg 175 penetrates a through-hole 158d provided in the lower surface of the seating space 158, and is thus positioned in a portion of the home-bar door 157 corresponding to the lower portion of the seating space 158. The insertion leg 175 controls the holder 171 to rotate only within a predetermined range, and simultaneously prevents the holder 171 from being detached out of the seating space 158. The holder 171 is provided so that a catching portion 172 supporting the lower end of the front surface of the communication pad 160 faces a supporting portion 174 supporting the rear surface of the communication pad 160. The catching portion 172 and the supporting portion 174 define both sidewalls of the insertion groove 173.

In addition, the upper and lower portions of the rear surface of the seating space 158 are formed with contact grooves 158b and 158c corresponding to the supporting portions 164 and 174 of the clamp 161 and the holder 171 in a shape and size, respectively. Thus, when the communication pad 160 is seated in the seating space 158, the supporting portions 164 and 174 of the clamp 161 and the holder 171 come into close contact with the contact grooves 158b and 158c, respectively, and thus do not protrude from an inner surface of the seating space 158.

A connector 178 is provided in the center of the bottom surface of the seating space 158. The connector 178 serves to electrically connect the communication pad 160 and the controller 159 to each other. The connector 178 protrudes upward from the bottom surface of the seating space 158 and is positioned in the insertion groove 173 through an opening 176 formed in the bottom surface of the holder 171. Then, the connector 178 is electrically connected to a connector 160', which is concavely provided in the lower surface of the communication pad 160 seated in the seating space 158.

In the meantime, a rear surface of the supporting portion 164 of the clamp 161 is provided with a locking bar 181. The locking bar 181 is formed to be inclined upward at a predetermined angle and has a front end formed with a catching groove 182 of a shape corresponding to that of a locking ball 185, which will be described below.

In addition, a slot 183 is formed to vertically extend in the home-bar door 157. The slot 183 is formed so that its upper end is inclined to the front of the home-bar door 157, so that the locking bar 181 is selectively inserted into an upper end of the slot 183. That is, a front end of the locking bar 181 is inserted into the slot 183 when the communication pad 160 is seated in the seating space 158.

The locking ball 185, which prevents the front end of the locking bar 181 inserted into the slot 183 from being removed out of the slot 183 according to a rotational angle of the home-bar door 157, is installed movably along the slot 183. That is, when the home-bar door 157 does not rotate, the locking ball 185 is positioned at a lower end of the slot 183 by the deadweight of the locking ball 185. Then, when the home-bar door 157 rotates from the above state, the locking ball 185 moves to the front end of the slot 183 therealong and is caught into the catching groove 182.

Hereinafter, the operation of the second embodiment of the present invention constructed as above will be described.

The operation for mounting the communication pad to the home-bar door in the present embodiment will be described with reference to FIGS. 9 and 10. In order to mount the communication pad 160 to the home-bar door 157, the holder 171 rotates counterclockwise in the figures, and the communication pad 160 slantingly moves at an angle corresponding to the rotation, so that the lower end of the communication pad 160 is inserted into the insertion groove 173 of the holder 171. At this time, the holder 171 is designed to rotate within a minimum range for inserting the communication pad 160.

In such a state, the catching portion 163 of the clamp 161 is positioned above a trace along which the upper end of the communication pad 160 rotates. Then, the communication pad 160 and the holder 171 rotate clockwise in the figures.

Figure 9:
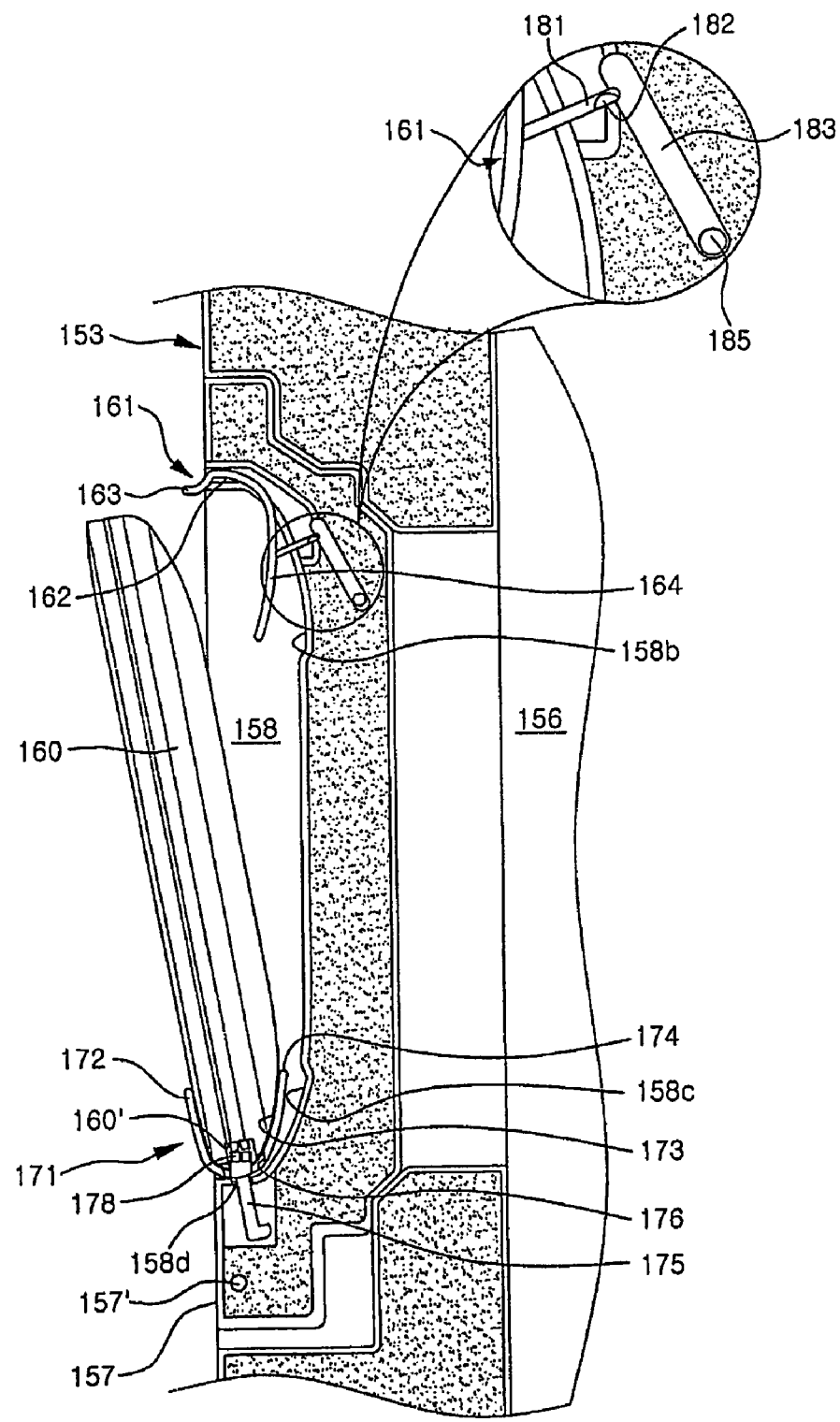
FIGS. 9 and 10 are views sequentially showing the process of mounting a communication pad into a seating space in the second embodiment according to the present invention.
Figure 10:
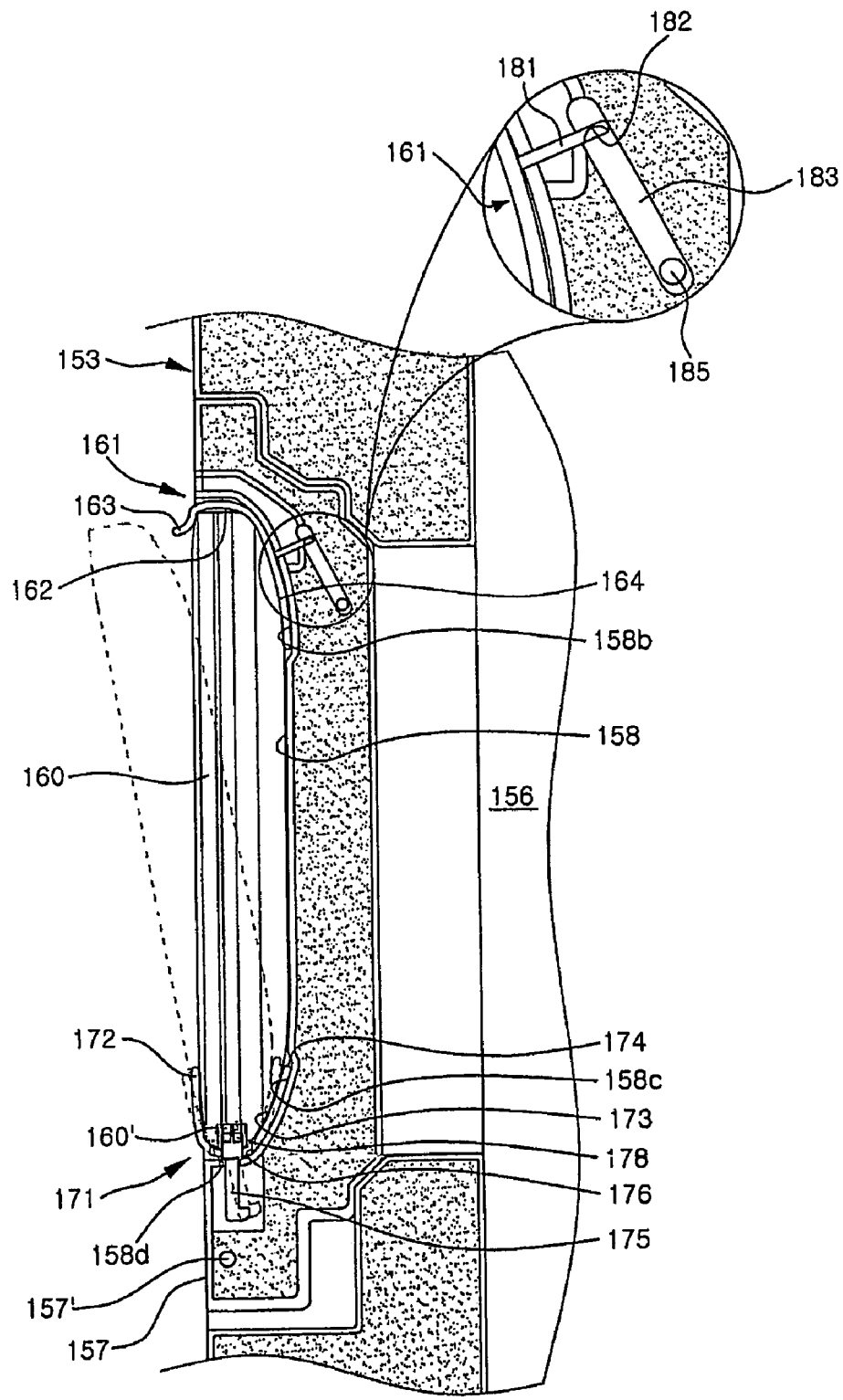

Therefore, as shown in FIG. 9, the upper end of the communication pad 160 is seated in the insertion groove 162 of the clamp 161 and simultaneously pushes the clamp 161 rearward. Then, the clamp 161 is pushed rearward by the communication pad 160 and rotates counterclockwise in the figures.

In addition, the rotation of the clamp 161 causes the supporting portion 164 to come into close contact with an interior of the contact groove 158b of the seating space 158. Then, the catching portion 163 of the clamp 161 moves downward and thus supports the upper front surface of the communication pad 160 to be seated in the seating space 158, so that the communication pad 160 is seated in the seating space 158.

Figure 11:
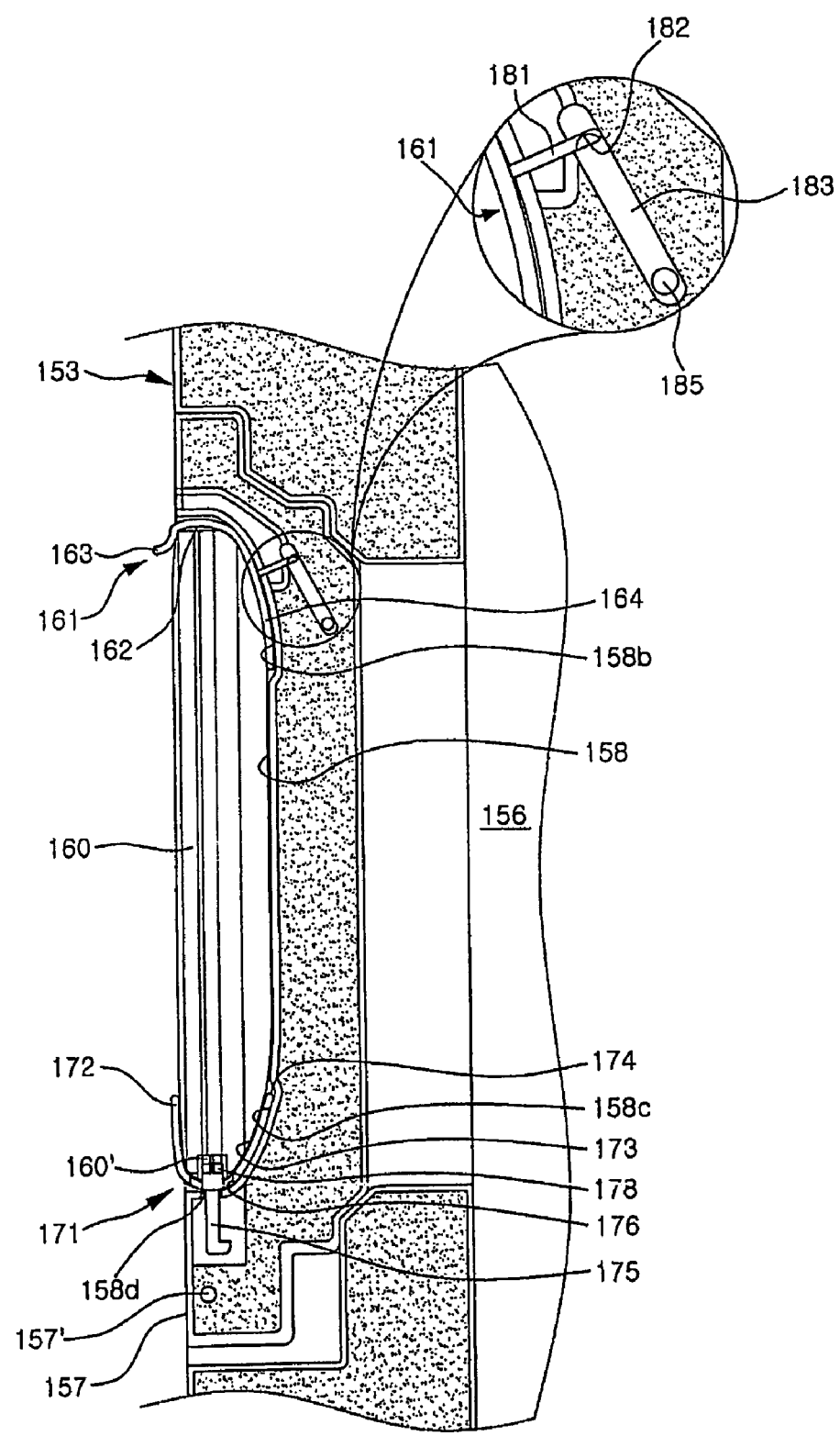
FIGS. 11 and 12 are views showing the operation for opening and closing a home-bar door in the second embodiment of the present invention.

Next, the operation of the home-bar door in the present embodiment will be described with reference to FIGS. 11 and 12. As shown in FIG. 11, when the home-bar door 157 closes the home-bar 156, the communication pad 160 is seated in the seating space 158 of the home-bar door 157 while the communication pad 160 is supported with the clamp 161 and the holder 171. Then, the slot 183 in the home-bar door 157 is positioned so that the front end of the slot 183 faces the front of the home-bar door 157, and the locking ball 185 in the slot 183 is positioned at the lower end of the slot 183 by the deadweight of the locking ball 185.

In such a state, the locking bar 181, which is inserted into the upper end of the slot 183, and the locking ball 185 are spaced apart from each other by a predetermined distance. Therefore, since the locking bar 181 is freely separated from the slot 183, the clamp 161 can freely rotate, thus allowing the communication pad 160 to be dismounted.

Figure 12:
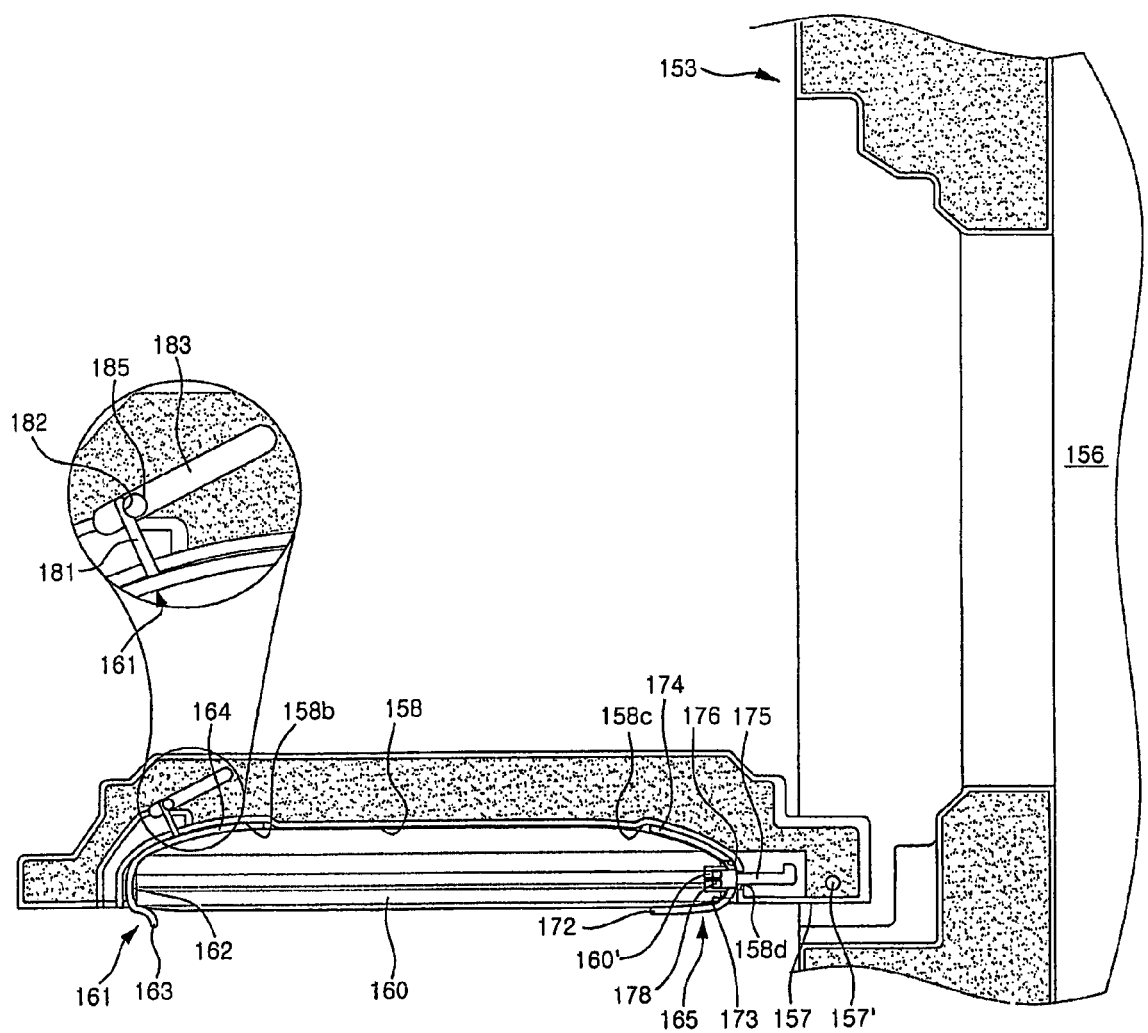

In addition, as shown in FIG. 12, in order to open the home-bar 156, the home-bar door 157 rotates counterclockwise in the figure. The home-bar door 157 rotates about 90 degrees, and is thus perpendicular to the front surface of the refrigerator door 153. Further, since the communication pad 160 also rotates in the same direction as the home-bar door 157 rotates, the communication pad 160 is subjected to a force caused from the deadweight thereof downward.

In the meantime, the rotation of the home-bar door 157 causes the slot 183 to also rotate about 90 degrees and thus to be positioned so that its upper end is inclined downward. Therefore, the locking ball 185 moves along the slot 183 and is thus positioned at the upper end of the slot 183, i.e., its left end in the figure.

Then, the locking ball 185, which moves along the slot 183 as above, comes into close contact with the front end of the locking bar 181 inserted into the left end of the slot 183 in the figure. After the slot 183 rotates and is then in horizontal state by the rotation of the home-bar door 157, the locking ball 185 begins to move at the moment when the upper end of the slot 183 begins to be inclined downward.

At this time, the locking ball 185 is caught into the catching groove 182 formed in the front end of the locking bar 181, so that the locking bar 181 is caused not to be removed from the slot 183. In addition, the insertion leg 175 positioned in the home-bar door 157 causes the holder 171 to be prevented from rotating beyond a predetermined range. Furthermore, the rotational range of the clamp 161 and the holder 171 is limited as above, so that the rotation of the home-bar door 157 is prevented from dismounting the communication pad 160 from the seating space 158 inadvertently.

Figure 13:
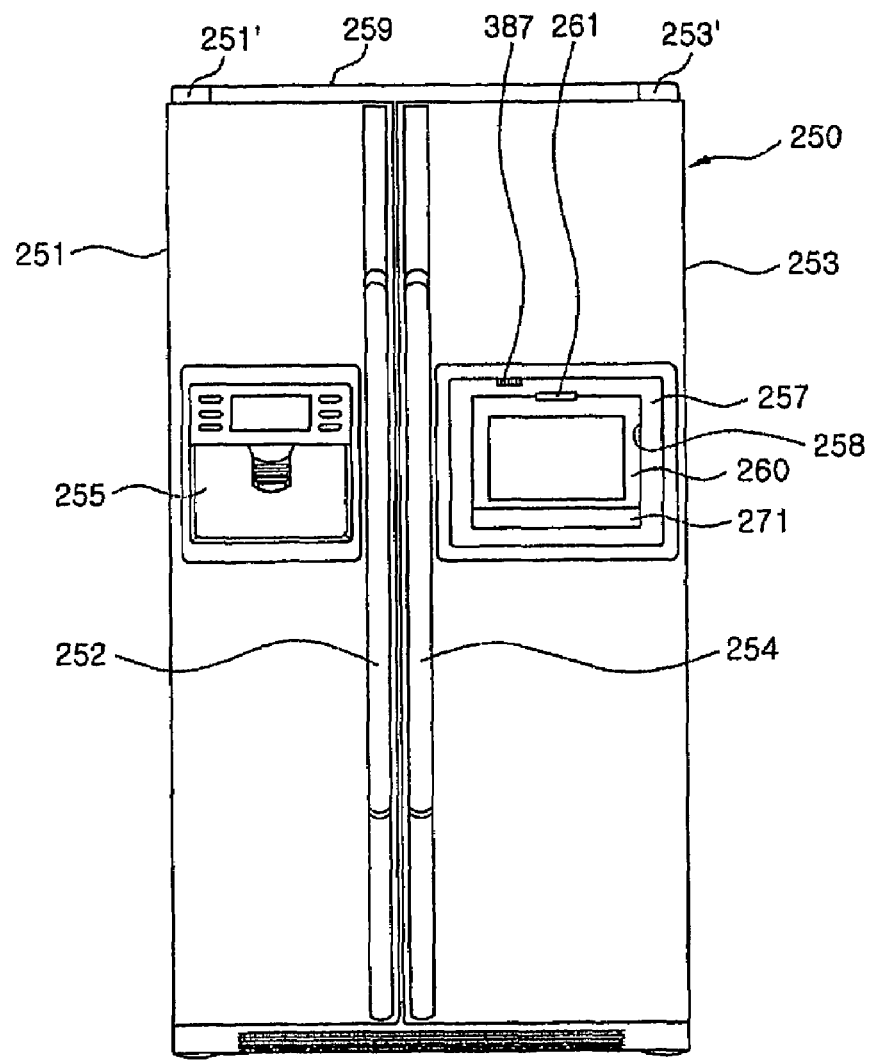
FIG. 13 is a front view showing a third embodiment of the present invention.

Next, a third embodiment of the present invention will be described with reference to FIGS. 13 and 14. According to the figures, a main body 250 of a refrigerator is mounted with a pair of doors 251 and 253 for opening and closing storage spaces formed in the main body 250. The doors 251 and 253 are rotatably mounted on a front surface of the main body 250 through hinge 251' and 253'.

The doors 251 and 253 are provided with door handles 252 and 254 which are gripped by a user for rotating the doors 251 and 253, respectively. In addition, a front surface of the door 251 of the doors 251 and 253 is provided with a dispenser 155 for discharging water or ice to the outside thereof.

A home-bar 256 is provided in the door 253 of the doors 251 and 253. Drinking water bottles and the like are accommodated in the home-bar 256, and a front surface of the door 253 is mounted with a home-bar door 257. An upper end of the home-bar door 257 may rotate about a hinge shaft 257', so that the home-bar 256 is selectively opened and closed.

Then, the home-bar door 257 is mounted with a communication pad 260. As the communication pad 260, a tablet computer may be used. The communication pad 260 is detachably mounted to the home-bar door 257 and is connected to a controller 259, which is provided on an upper surface of the main body 250, by wire or wireless.

Figure 14:
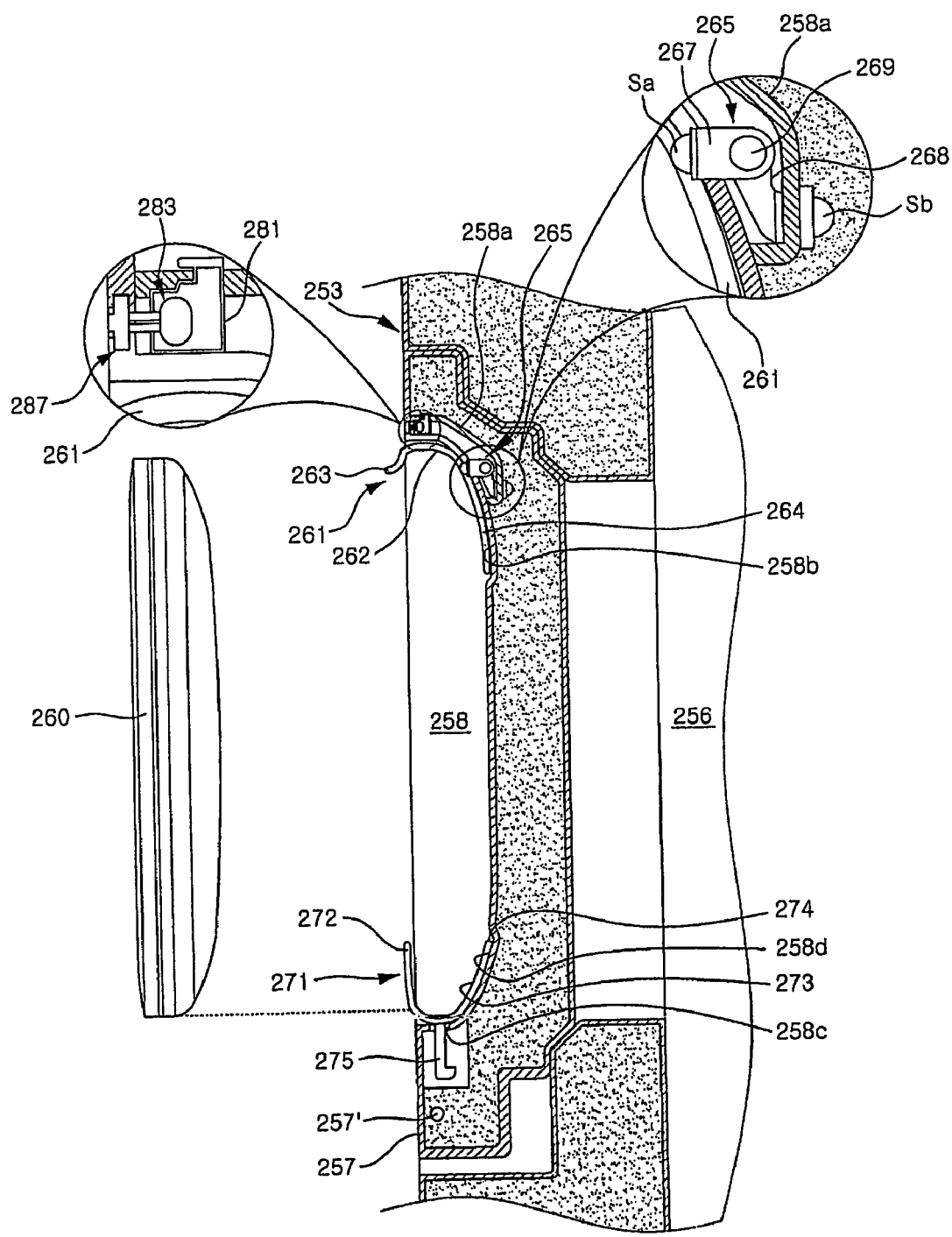
FIG. 14 is a sectional view showing the third embodiment of the present invention.

As shown in FIG. 14, a predetermined seating space 258 is provided in a front surface of the home-bar door 257. The seating space 258 is formed by concavely depressing a portion of the front surface of the home-bar door 257, and the communication pad 260 is seated in the seating space 258.

A clamp 261 and a holder 271 are installed in upper and lower ends of the seating space 258, respectively. The clamp 261, which supports an upper end of the communication pad 260, is formed with an insertion groove 262 in which at least a portion of the upper end of the communication pad 260, for example, an intermediate portion of the upper end of the communication pad 260 is seated. The insertion groove 262 is formed to laterally extend in the clamp 261. A lateral width of the clamp 261 is formed shorter than that of the communication pad 260 in the present embodiment. However, it is not necessary for the lateral width of the clamp 261 to be formed shorter than that of the communication pad 260.

A front end of the clamp 261 is provided with a catching portion 263 which extends with a predetermined downward and upward inclination in order to support a front surface of the upper end of the communication pad 260 seated in the insertion groove 262. An end of the clamp 261 corresponding to the catching portion 263 is provided with a supporting portion 264. The supporting portion 264 is formed to extend relatively longer than the catching portion 263. The supporting portion 264 serves to support a rear surface of the communication pad 260. The catching portion 263 and the supporting portion 264 define both sidewalls of the insertion groove 262. In addition, the clamp 261 is connected to an upper end of the seating space 258 through a hinge assembly 265 as in the first embodiment, and thus, is installed to be pivotable back and forth. The description of a structure of the hinge assembly 265 will be omitted.

The holder 271, which supports a lower end of the communication pad 260, is formed to have a lateral width corresponding to that of the communication pad 260. The holder 271 is formed with an insertion groove 273, which extends laterally and is opened upward in order to insert the lower end of the communication pad 260 into the insertion groove 273. An insertion leg 275 is provided in a bottom surface of the holder 271.

The insertion leg 275 penetrates a through-hole 258c provided in a lower surface of the seating space 258, and is thus positioned in a portion of the home-bar door 257 corresponding to the lower portion of the seating space 258. The insertion leg 275 controls the holder 271 to rotate only within a predetermined range, and simultaneously prevents the holder 271 from being detached out of the seating space 258. The holder 271 is provided so that a catching portion 272 supporting the lower end of the front surface of the communication pad 260 faces a supporting portion 274 supporting the rear surface of the communication pad 260. The catching portion 272 and the supporting portion 274 define both sidewalls of the insertion groove 273.

In addition, the upper and lower portions of the rear surface of the seating space 258 are formed with contact grooves 258b and 258d corresponding to the supporting portions 264 and 274 of the clamp 261 and the holder 271 in a shape and size, respectively. Thus, when the communication pad 260 is seated in the seating space 258, the supporting portions 264 and 274 of the clamp 261 and the holder 271 come into close contact with the contact grooves 258b and 258d, respectively, and thus do not protrude from an inner surface of the seating space 258.

In the meantime, a configuration such as a connector for electrically connecting the communication pad 260 and the controller 259 to each other is not illustrated additionally in the present embodiment. However, the configuration used in the second embodiment may be employed, or connectors may be provided in the rear surface of the communication pad 260 and the inner surface of the corresponding seating space 258. They may be applied to all the embodiments of the present invention.

Figure 15:
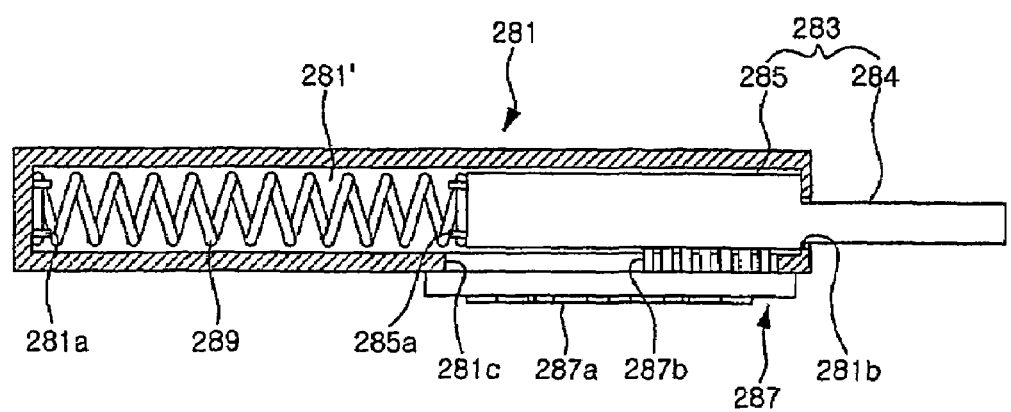
FIG. 15 is a transverse sectional view showing a locker of the third embodiment of the present invention.

A locker is provided in a portion of the home-bar door 257 corresponding to an upper portion of the clamp 261 in order to prevent the communication pad 260 from being removed inadvertently. Such a locker, as shown in FIG. 15, comprises a housing 281 in which a predetermined installation space is provided, a stopper 283 translated into and out of the housing 281 therethrough, and an elastic member 289 for exerting an elastic force on the stopper 283.

The housing 281, which is formed to have a predetermined lateral length, is installed adjacent to the right side of the upper end of the clamp 261 not to hinder the clamp 261 from rotating, and a predetermined installation space 281' is provided in the housing 281. Fixing guides 281a and a through-hole 281b are provided in both inner side surfaces of such an installation space 281', respectively, and a slot 281c is formed in a front surface of the installation space 281' in the lengthwise direction.

The fixing guides 281a for installing the elastic member 289 are formed in a circular cylindrical shape and protrude toward the through-hole 281b. The stopper 283 is mounted in the installation space 281' so that a portion of the stopper 283 can be translated laterally through the through-hole 281b.

The stopper 283 comprises a protruding portion 284 penetrating the through-hole 281b and protruding out of the housing 281, a catching portion 285 positioned in the housing 281. The protruding portion 284 is positioned on a trace along which the clamp 261 rotates, thus serving to prevent the clamp 261 from rotating, and is formed to have a relatively smaller area than the through-hole 281b.

At this time, the clamp 261 is not fixed by the protruding portion 284, but is limited in order not to rotate beyond a predetermined angle. The rotational angle of the clamp 261 which is limited by the protruding portion 284 is within the range in which the upper end of the communication pad 260 is not dismounted from the insertion groove 262 of the clamp 260.

In addition, the catching portion 285, which serves to prevent the stopper 283 from being fully removed out of the housing 281, is formed to have a relatively larger cross sectional area than the through-hole 281b. Fixing guides 285a protruding in the direction in which it face the fixing guides 281a and correspond thereto are provided on the left side surface of the catching portion 285.

Furthermore, an operating knob 287 is connected to a front surface of the catching portion 285. The operating knob 287 protrudes out of the home-bar door 257 while being connected to the catching portion 285, and thus, serves to make it possible for a user to laterally translate the stopper 283. An uneven portion 287a is provided on a front surface of the operating knob 287 in order to increase a frictional force between a user's finger and the front surface. In addition, the operating knob 287 is connected to the catching portion 285 through a connection neck 287b provided on a rear surface of the operating knob 287.

In the meantime, the elastic member 289, both ends of which are supported to the fixing guides 281a and 285a, respectively, exerts an elastic force so that the protruding portion 284 of the stopper 283 protrudes out of the housing 281. In a normal state, the elastic member 289 causes the protruding portion 284 of the stopper 283 to be fully exposed to the outside through the through-hole 281b.

Hereinafter, the operation for mounting the communication pad to the home-bar door in the third embodiment of the present invention will be described.

Figure 16:
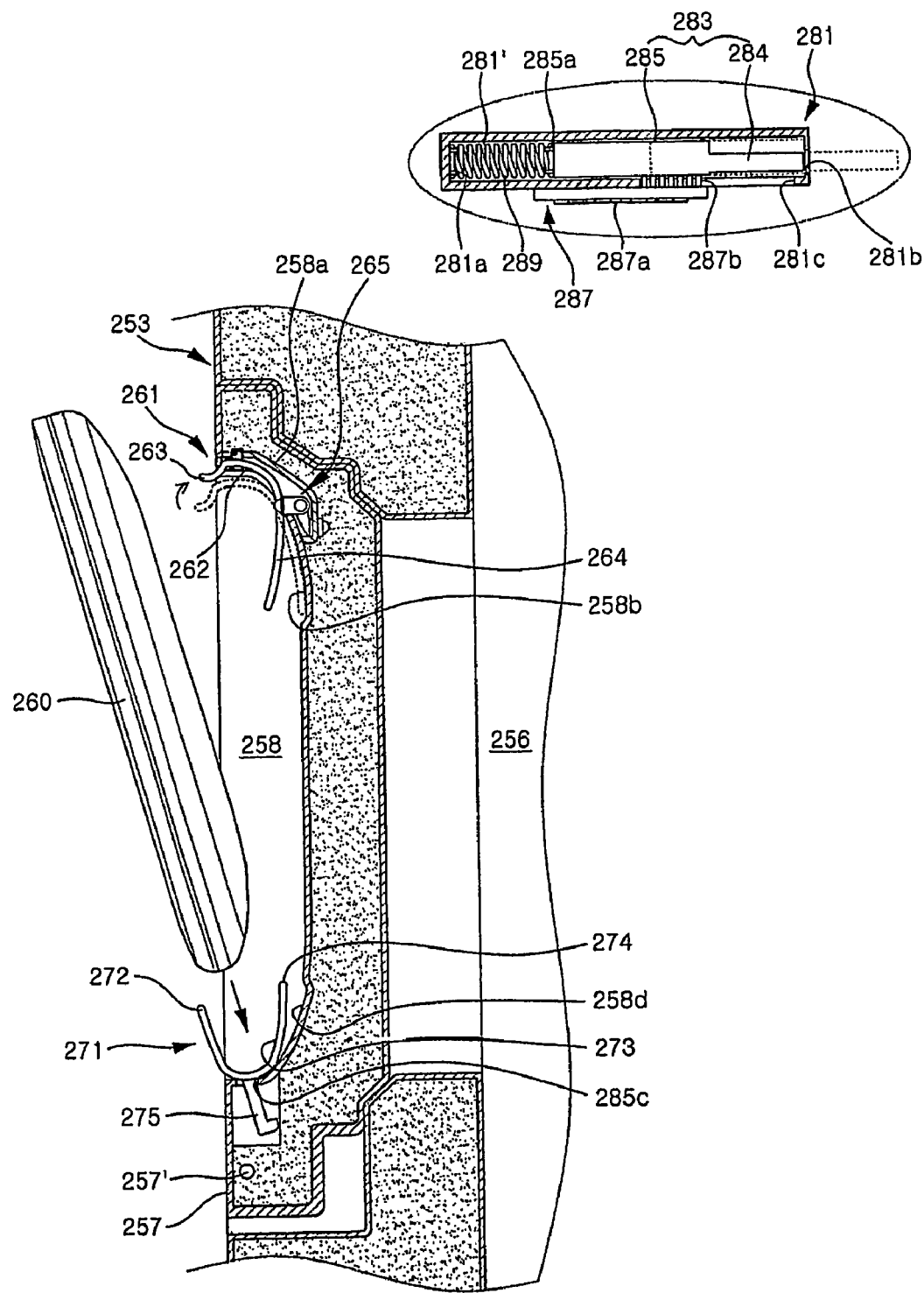
FIGS. 16 and 17 are views showing the operation of the third embodiment of the present invention.
Figure 17:
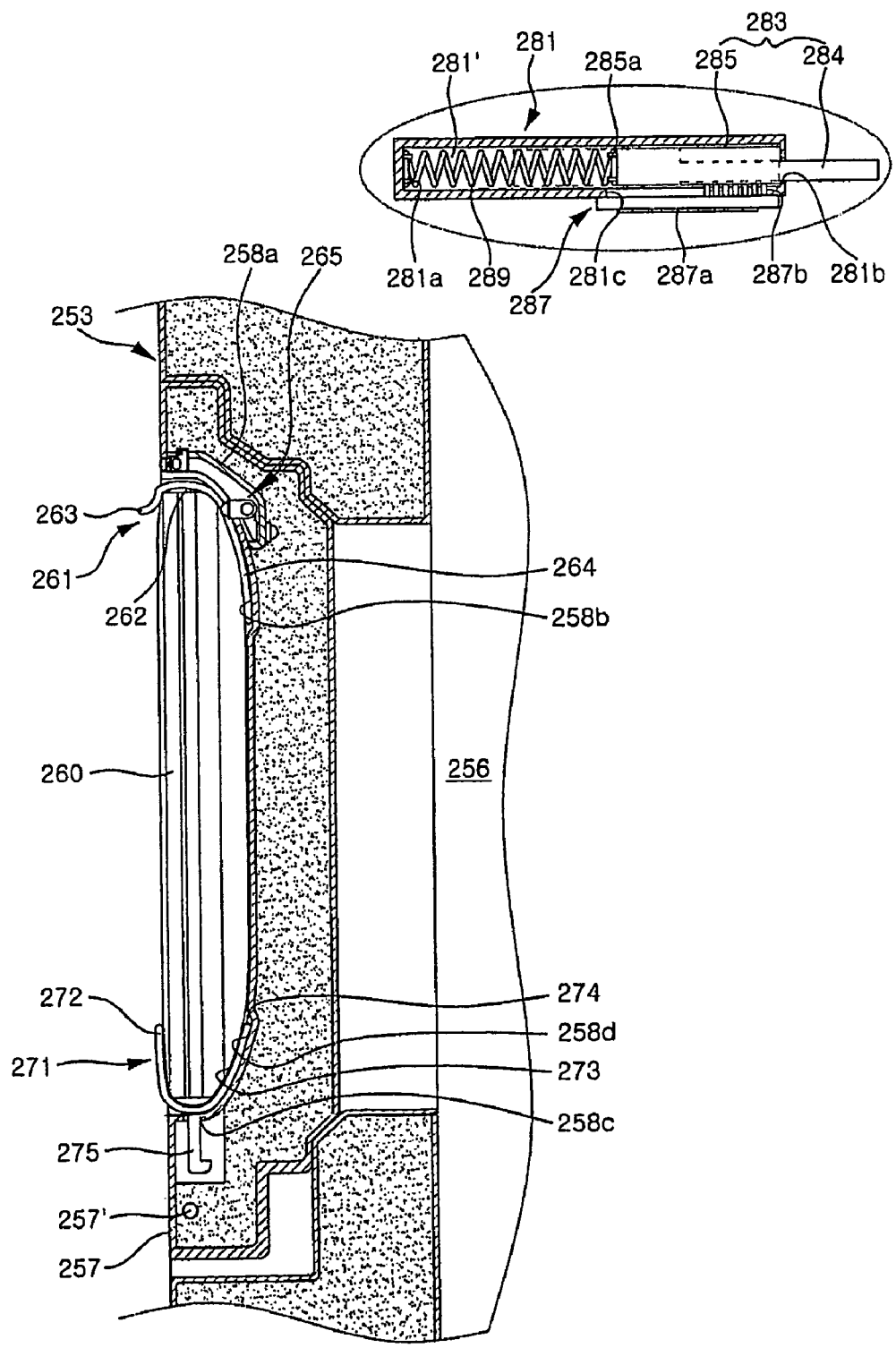

In the present embodiment, the operation for mounting the communication pad to the home-bar door is well illustrated in FIGS. 16 and 17.

That is, according to FIG. 16, the communication pad 260 slantingly moves at a predetermined angle, so that the lower end of the communication pad 260 is inserted into the insertion groove 273 of the holder 271. Then, as detailedly shown in FIG. 16, the stopper 283 moves to the left side in the figure by pushing the operating knob 287 to the left side in the figure by one hand.

Thus, the protruding portion 284 of the stopper 283, which has been positioned on the rotational trace of the clamp 261, is inserted into the housing 281, so that the clamp 261 may freely rotate. Here, the elastic member 289 provided between the housing 281 and the stopper 283 is in a compressed state. At this time, since the elastic member 289 exerts the elastic force on the stopper 283 to the right side in the figure, the operating knob 287 should be continuously kept pushed.

In such a state, when the clamp 261 rotates about the hinge assembly 265 clockwise in the figure, the catching portion 263 of the clamp 261 moves upward. Then, when a lower end of the catching portion 263 is positioned above a trace along which the upper end of the communication pad 260 rotates about the lower end thereof, the communication pad 260 rotates about the lower end thereof inserted in the insertion groove 273 of the holder 271 clockwise in the figure.

Accordingly, as shown in FIG. 17, the communication pad 260 pushes the clamp 261 rearward while the upper end of the communication pad 260 is seated in the insertion groove 262 of the clamp 261. Then, the clamp 261 is pushed rearward by the communication pad 260 and simultaneously rotates about the hinge assembly 265 counterclockwise in the figures.

In addition, the rotation of the clamp 261 causes the supporting portion 264 to come into close contact with an interior of the contact groove 258b of the seating space 258. Then, the catching portion 263 moves downward and thus supports the upper end of the front surface of the communication pad 260 seated in the seating space 258, so that the communication pad 260 is seated in the seating space 258.

In such a state, as detailedly shown in FIG. 17, the external force is removed by taking away the hand by which the operating knob 287 is pushed to the left side in the figure. Thus, the operating knob 287 and the stopper 283 move to the right side in the figure by the elastic force of the elastic member 289, and the protruding portion 284 protrudes out of the housing 281. In addition, a bottom surface of the protruding portion 284 is positioned on the rotational trace of the clamp 261.

Therefore, the clamp 261 may rotate only within the range where the upper surface of the clamp 261 comes into contact with the protruding portion 284, that is, the communication pad 260 is not dismounted from the insertion groove 262 of the clamp 261 and is prevented from rotating clockwise in the figure beyond the range. That is, even when the home-bar door 257 mounted with the communication pad 260 rotates, the communication pad 260 supported by the clamp 261 is caused not to be dismounted from the seating space 258.

Particularly, when the home-bar door 257 is opened, the front surface of the communication pad 260 seated in the seating space 258 is directed to the direction of gravity. However, the protruding portion 284 of the stopper 283 prevents the holder 261 from rotating and thus causes the communication pad 260 not to be dismounted from the seating space 258.

Figure 18:
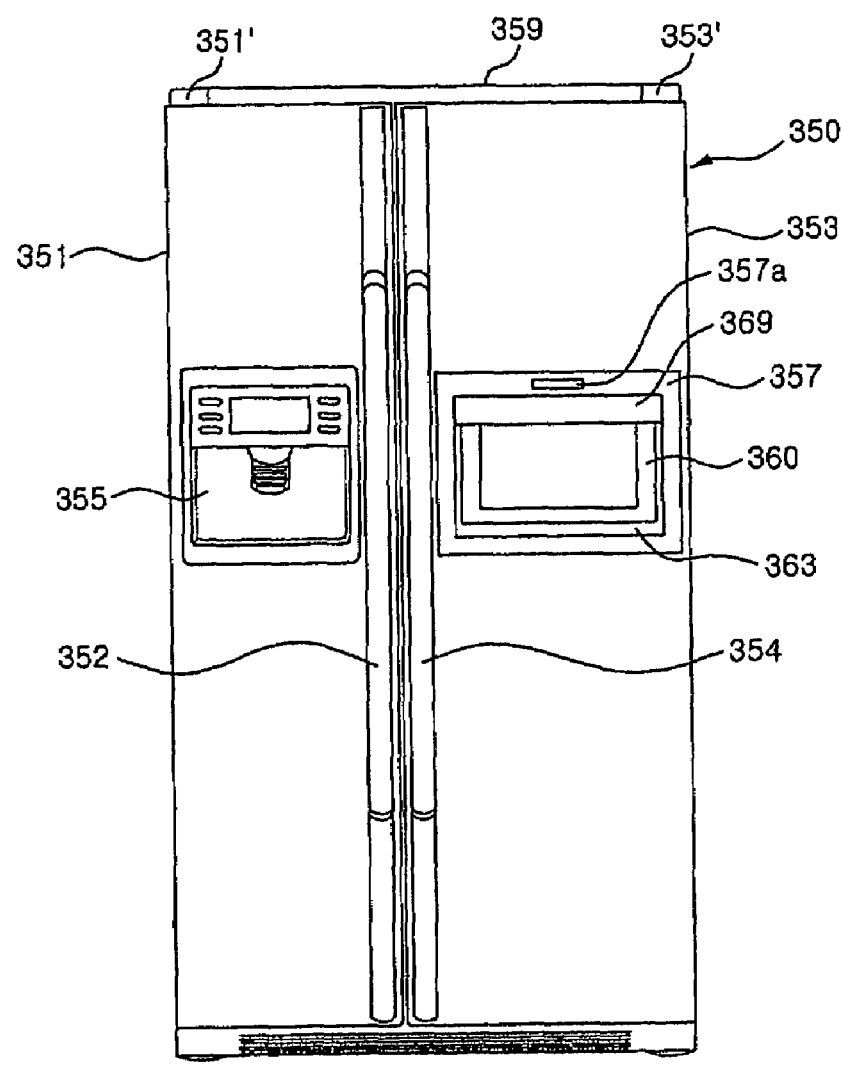
FIG. 18 is a front view showing a fourth embodiment of the present invention.

Next, a fourth embodiment of the present invention will be described with reference to FIGS. 18 and 19. According to the figures, a main body 350 of a refrigerator is mounted with a pair of doors 351 and 353. The doors 351 and 353 are mounted rotatably about hinges 351' and 353', respectively, and thus selectively open and close storage spaces provided in the main body 350.

The doors 351 and 353 are provided with door handles 352 and 354 which are gripped by a user for rotating the doors 351 and 353, respectively. In addition, a front surface of the door 351 of the doors 351 and 353 is provided with a dispenser 355 for discharging water, ice or the like to the outside thereof.

A home-bar 356 is provided in the door 353 of the doors 351 and 353. Drinking water bottles and the like are accommodated in the home-bar 356, and the door 353 is mounted with a home-bar door 357. An upper end of the home-bar door 357 rotates about a hinge 357', so that the home-bar 356 is selectively opened and closed.

Then, the home-bar door 357 is mounted with a communication pad 360. As the communication pad 360, a tablet computer may be used. The communication pad 360 is detachably mounted to the home-bar door 357 and connected to a controller 359, which is provided on an upper surface of the main body 350, by wire or wireless.

Reference numeral 357a designates an operating handle. The operating handle 357a, which is provided on the upper end of the front surface of the home-bar door 357, is a portion which the user grips by hand for opening and closing the home-bar 356 by rotating the home-bar door 357.

Figure 19:
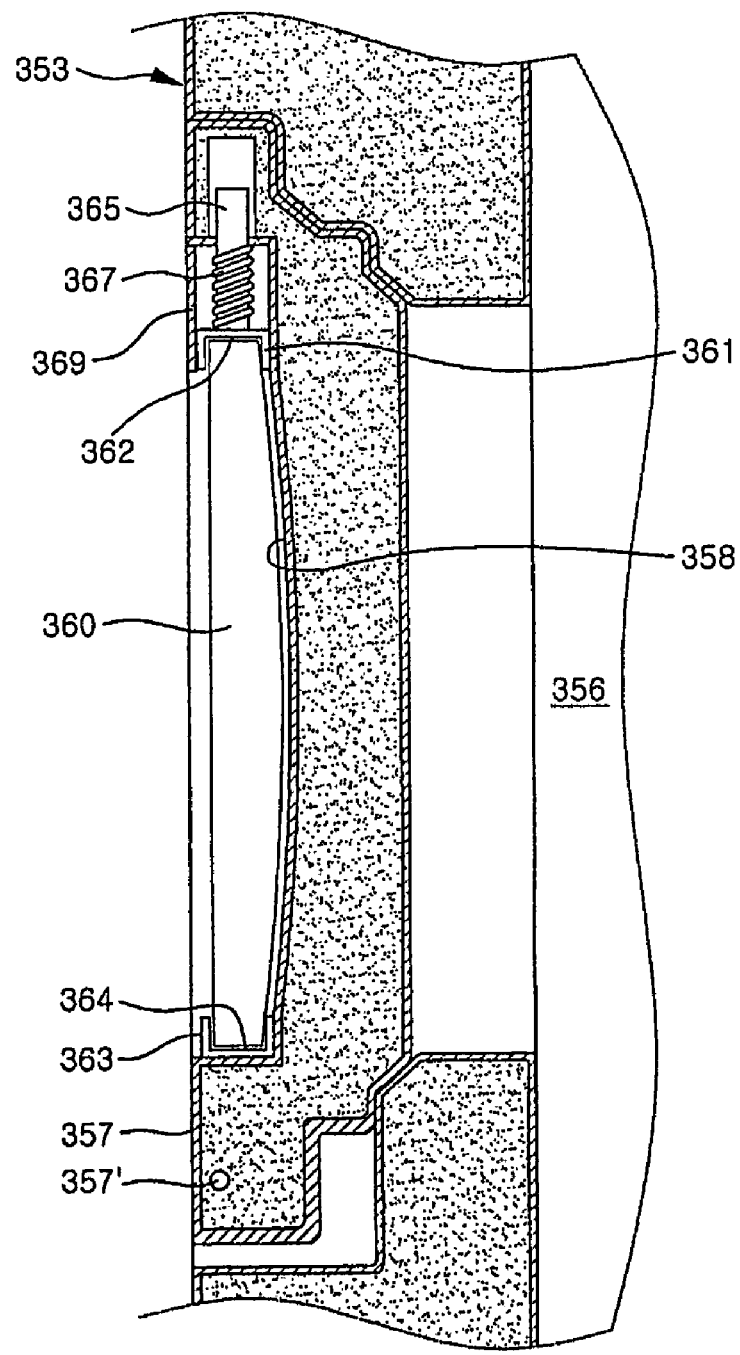
FIG. 19 is a sectional view showing the fourth embodiment of the present invention.

As shown in FIG. 19, the home-bar door 357 is provided with a predetermined seating space 358. The seating space 358 is formed by concavely depressing a portion of the front surface of the home-bar door 357, and the communication pad 360 is seated in the seating space 358.

Upper and lower portions of the seating space 358 are provided with an upper holder 361 and a lower holder 363, respectively. The upper and lower holders 361 and 363 are formed to have a lateral width corresponding to that of the communication pad 360, and formed with insertion grooves 362 and 364, which are opened upward and downward and extend laterally, and in which upper and lower ends of the communication pad 360 are seated to be supported.

In the meantime, at least a guide rib 365 is provided between a ceiling of the seating space 358 and an upper surface of the upper holder 361. While a lower end of the guide rib 365 is fixed to the upper surface of the upper holder 361, an upper end of the guide rib 365 is upward inserted into the ceiling of the seating space 358, that is, the home-bar door 357. Thus, the upper holder 361 may vertically move by a distance corresponding to a length of the guide rib 365.

Then, a coil spring 367 is vertically installed around the guide rib 365. That is, upper and lower ends of the coil spring 367 are supported by the ceiling of the seating space 358 and the upper surface of the upper holder 361, and thus, downward exerts an elastic force on the upper holder 361.

In the meantime, an upper portion of a front end of the seating space 358 is provided with a cover 369. The cover 369, which causes the guide rib 365 and the coil spring 367 not to be exposed to the outside, is formed to have a height corresponding to a height difference between the seating space 358 and the communication pad 360.

In addition, the cover 369 is installed so as to guide of the vertical movement of the upper holder 361. That is, since the upper holder 361 vertically moves while a front surface of the upper holder 361 is in contact with a rear surface of the cover 369, the upper holder 361 is prevented from moving slantingly forward or rearward while vertically moving, so that the upper end of the communication pad 360 can be precisely seated in the insertion groove 362 of the upper holder 361.

Hereinafter, in the present embodiment, the operation for mounting the communication pad to the seating space will be described with reference to FIGS. 20 to 22.

Figure 20:
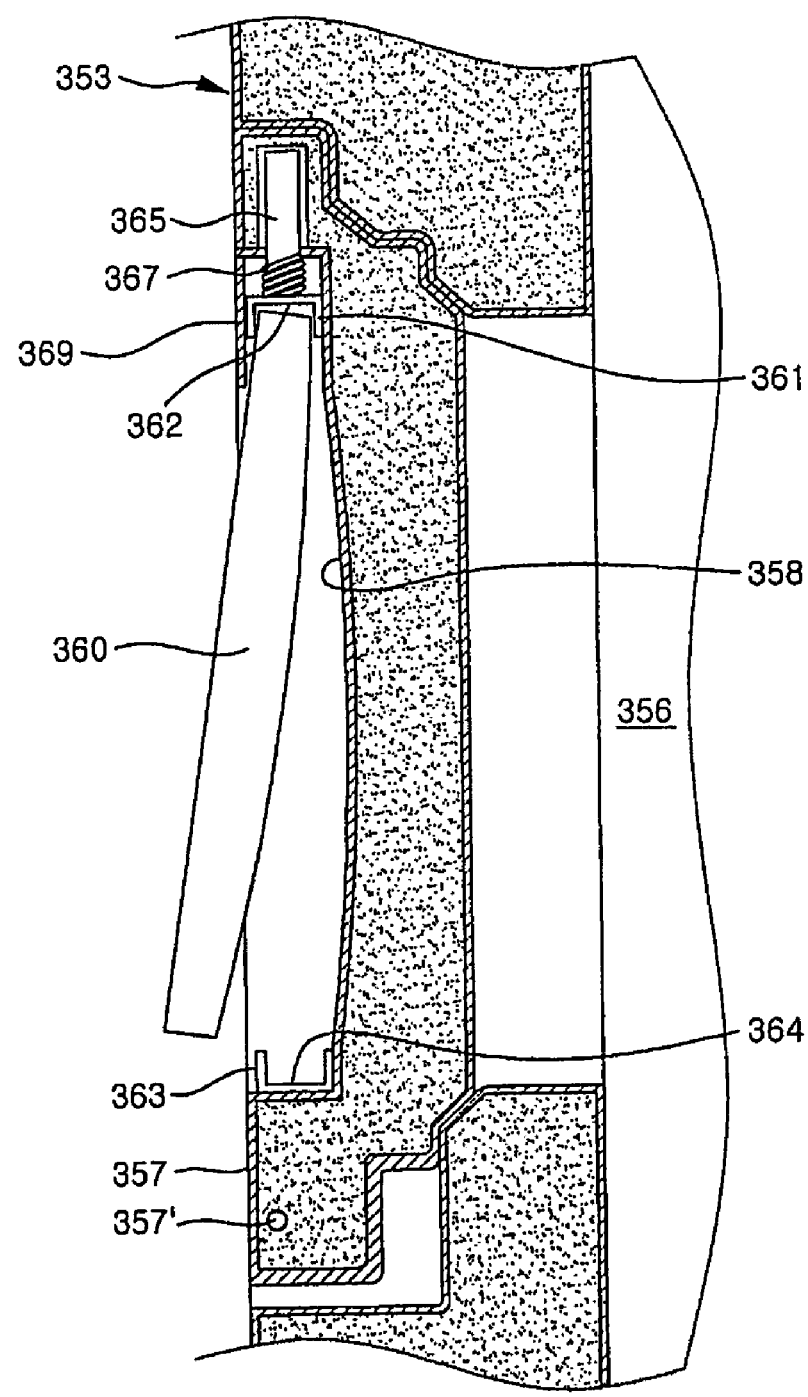
FIGS. 20 to 22 are views sequentially showing the operation of the fourth embodiment of the present invention.
Figure 21:
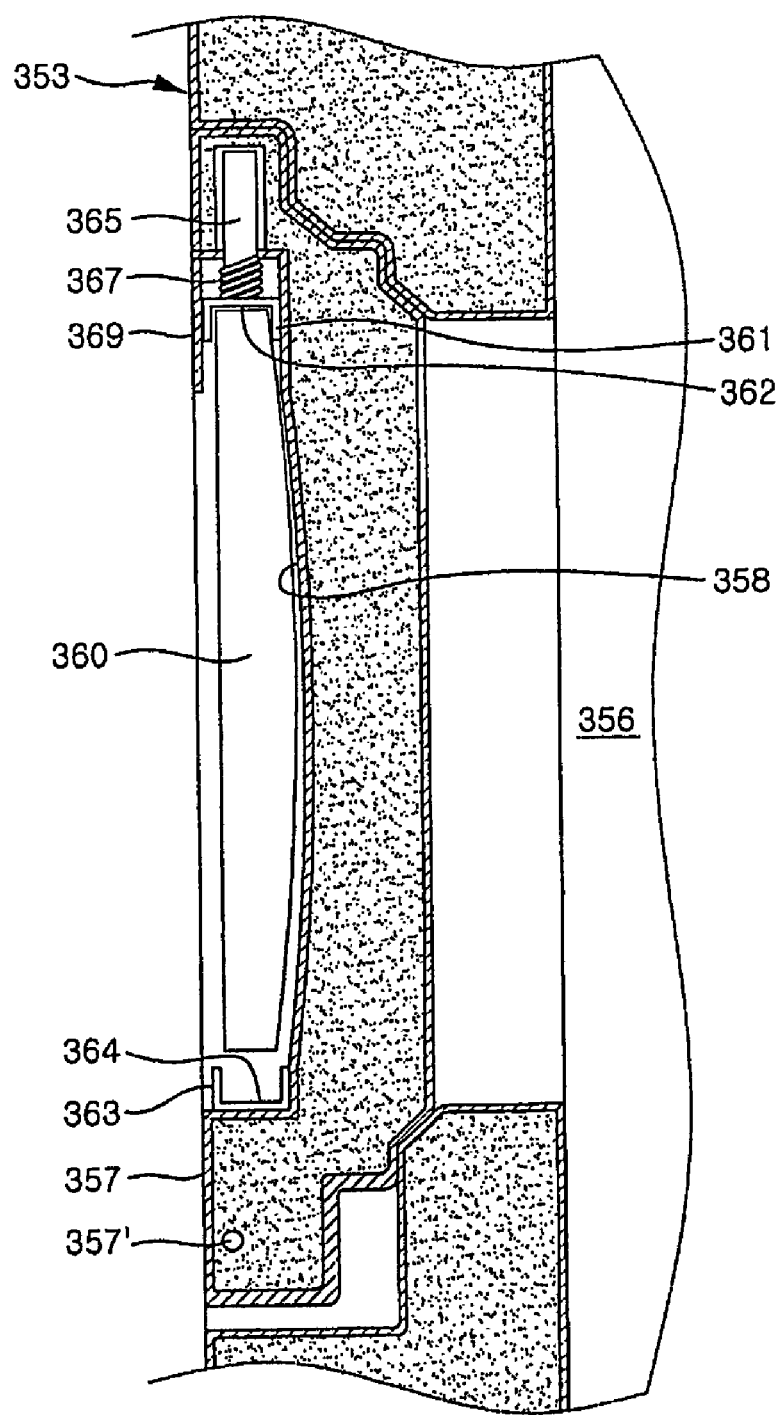

First, as shown in FIG. 20, the communication pad 360 is slantingly moved upward in order to have a predetermined inclination. At this time, the upper end of the communication pad 360 pushes the upper holder 361 upward while being seated in the upper holder 361 provided in the seating space 358 of the home-bar door 357.

Then, the communication pad 360 moves upward and is thus positioned so that the lower holder 363 of the seating space 358 does not hinder the communication pad 360 from rotating. That is, the communication pad 360 moves upward so that the lower holder 363 is positioned below a rotational trace of the communication pad 360.

Due to the movement of the upper holder 361, the upper portion of the guide rib 365 provided between the seating space 358 and the upper holder 361 is upward inserted into the ceiling of the seating space 358, that is, the home-bar door 357. In addition, the coil spring 367 surrounding the guide rib 365 is compressed by a distance through which the upper holder 361 moves.

In such a state, the communication pad 360 rotates about its upper end seated in the upper holder 361 counterclockwise in the figure. Thus, as shown in FIG. 21, the communication pad 360 rotates and then is substantially vertical, and the lower end thereof is positioned directly above the lower holder 363.

Figure 22:
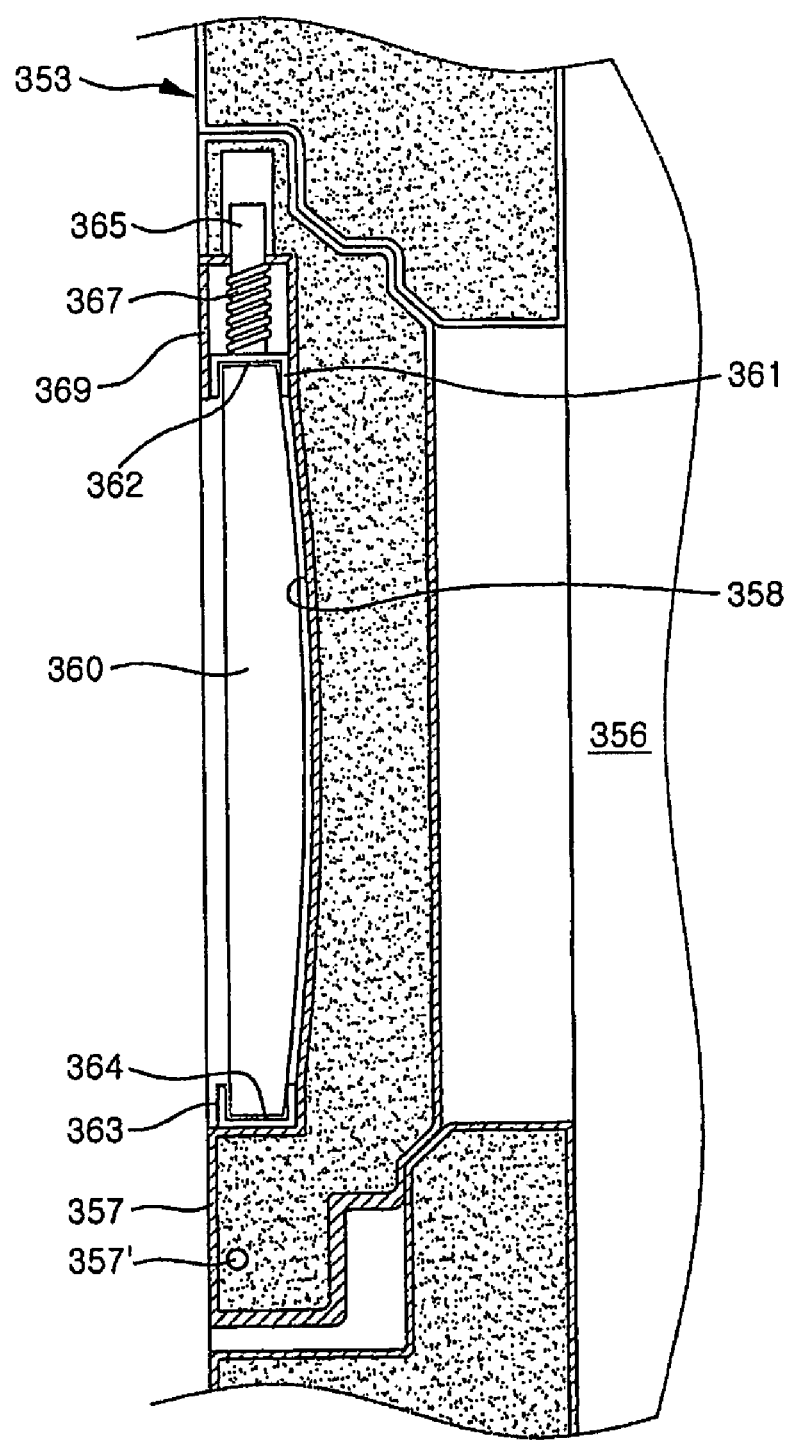

At this time, as shown in FIG. 22, when the external force causing the upper holder 361 to move upward is removed, the elastic force of the coil spring 367 causes the upper holder 361 and the communication pad 360 seated in the upper holder 361 to move downward. Thus, the lower end of the communication pad 360 is seated in the lower holder 363. Then, while the upper and lower ends of the communication pad 360 are supported by the upper and lower holders 361 and 363 as above, respectively, the elastic force of the coil spring 367 causes the communication pad 360 not to be dismounted from the seating space 358.

Then, in the present embodiment, since the upper and lower holders 361 and 363 which cause the communication pad 360 to be supported in the seating space 358 are configured not to rotate in and out of the seating space 358, the communication pad 369 is not dismounted from the seating space 358 even when the home-bar door 357 is opened.

In the meantime, in the present embodiment, the upper holder 361 is vertically movably installed at the upper portion of the seating space 358 and the lower holder 363 is fixed to the lower portion of the seating space 358, but it is not limited thereto. That is, the upper holder 361 may be fixed to the upper portion of the seating space 358 and the lower holder 363 may be vertically movably installed at the lower portion of the seating space 358, or both may be vertically movably installed.

In addition, although the coil spring 367 is used as an elastic member for exerting the elastic force on the upper holder 361, any other configuration may be used if an elastic force can be exerted on the upper holder 361.

Figure 23:
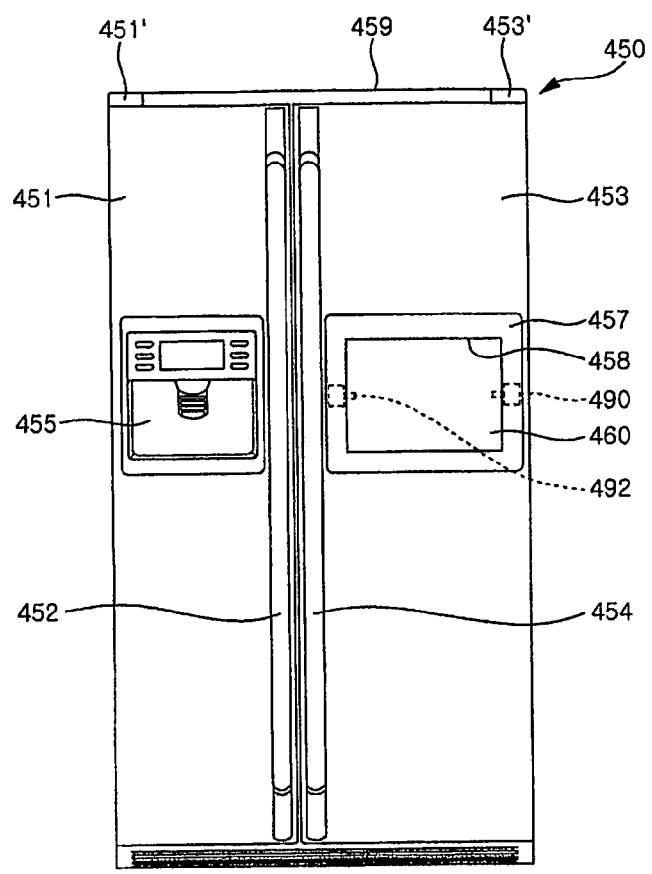
FIG. 23 is a front view showing the refrigerator to which a first modification of the present invention is applied.
Figure 24:
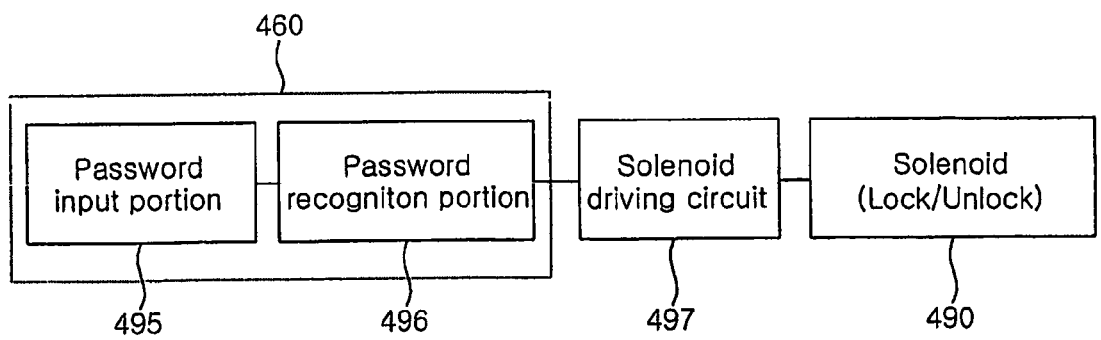
FIG. 24 is a control block diagram of the first modification of the present invention.

Next, in a case where the communication pad 360 may be dismounted from the seating space as in the aforementioned first to fourth embodiments, a configuration, which makes it possible to separate the communication pad seated in the seating space only when a user wishes to do so, may be employed. A first modification of the embodiments of the present invention will be described as an example of the configuration with reference to FIGS. 23 and 24.

According to the figures, a pair of doors 451 and 453 are installed on a front surface of a main body 450 in which storage spaces are formed. The doors 451 and 453 are mounted rotatably about hinges 451' and 453', which are provided on upper and lower portions of both side ends of the main body 450, and thus serve to selectively open and close the storage spaces provided in the main body 450.

The doors 451 and 453 are provided with door handles 452 and 454 which are gripped by a user for rotating the doors 451 and 453, respectively. In addition, a front surface of the door 451 of the doors 451 and 453 is provided with a dispenser 455 for supplying water or ice to the outside thereof.

In the meantime, a home-bar door 457, which may selectively open and close a home-bar 456 with a storage space, is provided in the door 453 of the doors 451 and 453. Drinking water bottles and the like are accommodated in the home-bar 456, and the door 453 is mounted with a home-bar door 457. An upper end of the home-bar door 457 rotates about a lower end thereof, so that the home-bar is selectively opened and closed.

Then, a front surface of the home-bar door 457 is formed with a seating space 458, so that a communication pad 460 is installed therein. As the communication pad 460, a tablet computer may be used. The communication pad 460 is detachably mounted to the home-bar door 457 and electrically connected to a controller 459, which is provided on an upper surface of the main body 450, by wire or wireless.

Here, solenoids 490 are installed in the home-bar door 457. The solenoids 490 are configured so that plungers 492 thereof may selectively move into the interior of the seating space 458. It is preferred that the solenoids 490 be installed in both inner sidewalls of the seating space 458. For example, the solenoids 490 may operate so that the plungers 492 are housed into the solenoids 490 when the solenoids 490 are energized and that the plungers 492 move into the interior of the seating space 458 when the solenoids 490 are de-energized. The solenoids 490 may operate reversely. For reference, both side surfaces of the communication pad 460 are formed with insertion holes (not shown) into which the plungers 492 can be inserted.

In order to operate the solenoids 490, the communication pad 460 is provided with a password input portion 495 and a password recognition portion 496. The password input portion 495 and the password recognition portion 496 may be provided in the home-bar door 457, the door 451 or 453, the main body 450, or the like. The password input portion 495 is a portion which receives a password by a user, and the password recognition portion 496 is a portion which compares a password input through the password input portion 495 and a password previously registered therein with each other and then determines whether the solenoids 490 are caused to operate.

When the password is confirmed in the password recognition portion 496, an operating signal of the solenoids 490 is provided. The operating signal is transmitted to a solenoid driving circuit 497 that is a release operating portion. The solenoid driving circuit 497 is preferably provided in the controller 459. The solenoid driving circuit 497 serves to receive the operating signal provided after the password is confirmed and to cause the plungers 492 of the solenoids 490 to be housed.

In the meantime, the operation for locking the communication pad 460 to the seating space 458 by means of the solenoids 490 will be described. To this end, it is possible to allow the plungers 492 to be inserted into the insertion holes of the communication pad 460 when the user separately operates the solenoids 490, or automatically whenever the communication pad 460 is mounted into the seating space 458.

For reference, although in the present modification, the communication pad 460 is fixed to the seating space 458 using the solenoids 490, it is not necessarily so, and for example, the communication pad 460 may be fixed to the seating space 458 using a magnet switch. That is, the communication pad 460 may be locked or released by turning the magnet switch on or off.

Now, the operation of the first modification of the present invention will be described. In order to release a locking state where the communication pad 460 is mounted and locked to the seating space 458, the user inputs a password through the password input portion 495.

When the password is input, the password recognition portion 496 compares the input password with the previously registered password, and then, provides the operating signal to the solenoid driving circuit 497 if both passwords agree with each other. When the operating signal is provided in the solenoid driving circuit 497, the solenoids 490 operate.

That is, the plungers 492 of the solenoids 490 operate to get out of the insertion holes of the communication pad 460 and be housed. In such a state, the communication pad 460 may be separated from the seating space 458.

In the above state, the user may separate the communication pad 460 from the seating space 458 in the manner described in the above embodiments, and use the communication pad 460 while it is separated from the seating space 458.

Figure 26:
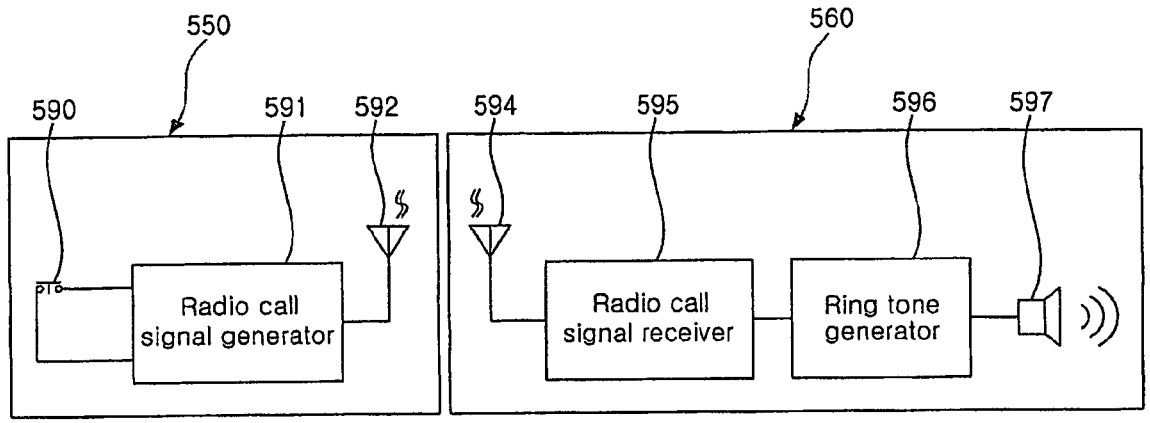
FIG. 26 is a block diagram of the second modification of the present invention.
Figure 27:
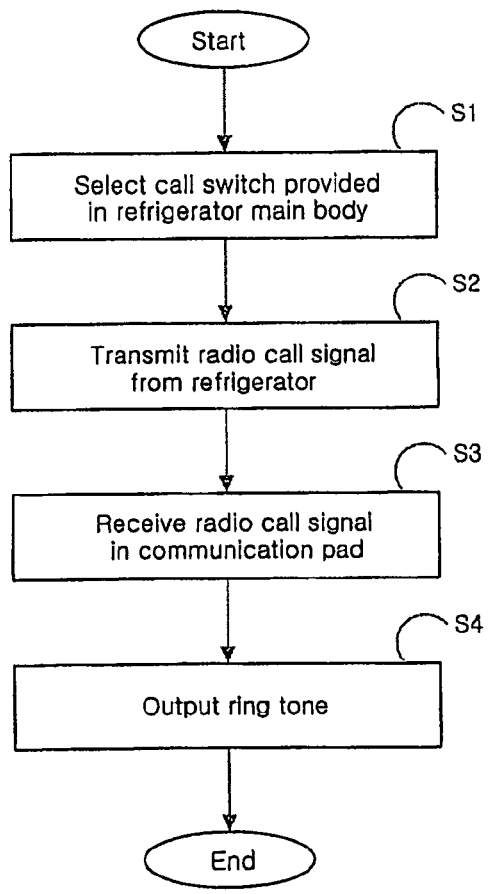
FIG. 27 is a flowchart showing an operational process of the second modification of the present invention.

Next, in a case where the communication pad can be dismounted from the seating space as in the aforementioned first to fourth embodiments, a configuration, which makes it possible to find the separated communication pad easily, may be employed. A second modification of the embodiments of the present invention will be described as an example of the configuration with reference to FIGS. 25 to 27.

According to the figures, a pair of doors 551 and 553 are installed rotatably about hinges 551' and 553' on a front surface of a main body 550 in which storage spaces are formed. The doors 551 and 553 serve to selectively open and close the storage spaces provided in the main body 550. The doors 551 and 553 are provided with door handles 552 and 554 which are gripped by a user for rotating the doors 551 and 553, respectively. In addition, a front surface of the door 551 of the doors 551 and 553 is provided with a dispenser 555 for supplying water or ice to the outside thereof.

In the meantime, a home-bar door 557, which may selectively open and close a home-bar 556 with a storage space, is provided in the door 553 of the doors 551 and 553. Drinking water bottles and the like are accommodated in the home-bar 556, and the door 553 is mounted with the home-bar door 557. An upper end of the home-bar door 557 rotates about a lower end thereof, so that the home-bar is selectively opened and closed.

Then, a front surface of the home-bar door 557 is formed with a seating space 558, so that a communication pad 560 is installed therein. As the communication pad 560, a tablet computer may be used. The communication pad 560 is detachably mounted to the home-bar door 557 and electrically connected to a controller 559, which is provided on an upper surface of the main body 550, by wire or wireless.

Now, when the communication pad 560 is separated from the seating space 558, a configuration for easily finding the communication pad 560 will be described.

The main body 550 is provided with a call switch 590. In the present embodiment, the call switch 590 is provided on the front surface of the home-bar door 557 adjacent to a periphery of the seating space 558, but it is not necessarily so. For example, it may be installed on the controller 559.

In order to modulate a signal transmitted from the call switch 590 into a radio signal for transmission, a radio call signal generator 591 is provided in the main body 550. The radio call signal generator 591 may also be provided in the controller 559. The radio signal generated in the radio call signal generator 591 is transmitted through an antenna 592. The antenna 592 is preferably provided on the front surface of the main body 550 or the front surface of the door 551 or 553.

In the meantime, the communication pad 560 is provided with an antenna 594 for receiving the call signal transmitted from the main body 550 side. The antenna 594 is preferably provided on a front surface of the communication pad 560. In order to receive only the call signal among signals captured by the antenna 594, the communication pad 560 is provided with a radio call signal receiver 595. The radio call signal receiver 595 detects only the signal generated in the radio call signal generator 591 and transmits it to a ring tone generator 596.

Figure 25:
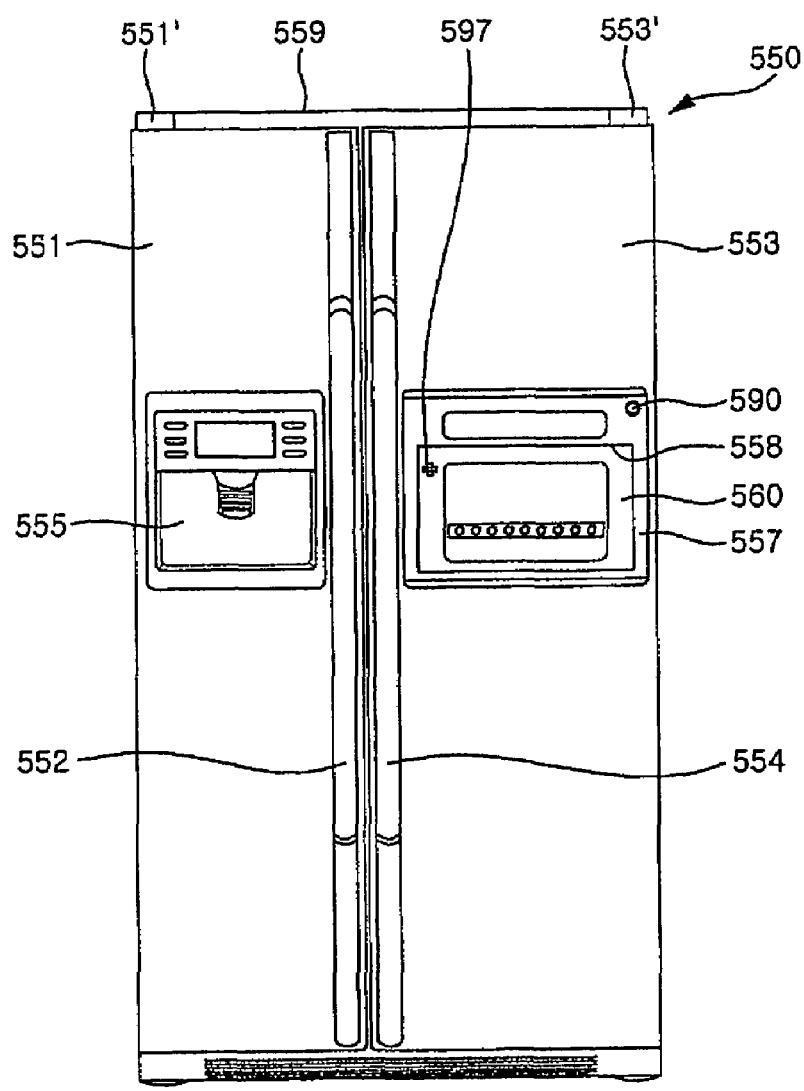
FIG. 25 is a front view showing the refrigerator to which a second modification of the present invention is applied.

The ring tone generator 596 generates a ring tone when the call signal is transmitted from the radio call signal receiver 595. The ring tone is output through a speaker 597. The speaker 597 is provided on the front surface of the communication pad 560, as shown in FIG. 25.

The operation of the second modification of the present invention constructed as above will be described. In a state where the communication pad 560 is separated from the main body 550, when a user cannot find the communication pad 560, the user pushes the call switch 590 (S1).

When the call switch 590 is pushed, the radio call signal generator 591 generates the radio call signal. The radio call signal is transmitted through the antenna 592 (S2). The radio call signal transmitted through the antenna 592 is transmitted from the refrigerator main body 550 to its surroundings.

The radio call signal transmitted from the antenna 592 of the main body 550 is captured by the antenna 594, when the communication pad 560 is in the surroundings. Although a variety of signals may be captured by the antenna 594, only the radio call signal is selected in the radio call signal receiver 595 (S3).

If the radio call signal is confirmed in the radio call signal receiver 595, the signal is transmitted to the ring tone generator 596. When the signal is transmitted to the ring tone generator 596, the ring tone is generated. The ring tone is output to the outside through the speaker 597 (S4). When the ring tone is output through the speaker 597 as described above, the user listens to the ring tone and then confirms where the communication pad 560 is. Therefore, it is possible for the user to easily confirm the position of the communication pad 560 separated from the main body 550.

In the meantime, a third modification of the present invention will be described by citing the reference numerals of the second embodiment shown in FIG. 8.

The modification is for the purpose of preventing the connector 178, which is exposed in the seating space 158, from short-circuiting by water, metal or the like.

Figure 28:
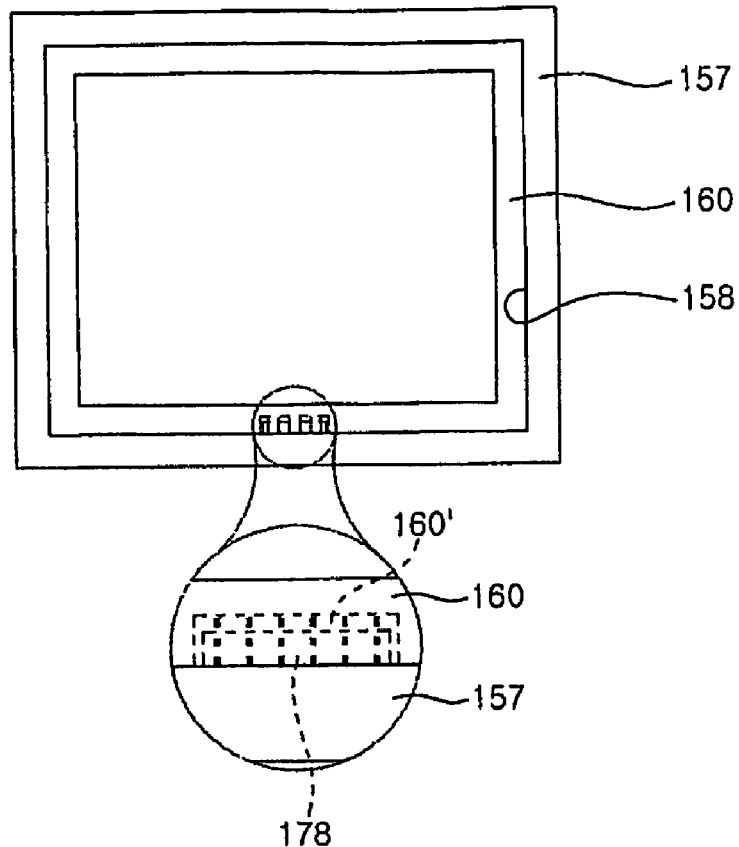
FIG. 28 is a schematic view showing a major portion of a third modification of the present invention.
Figure 29:
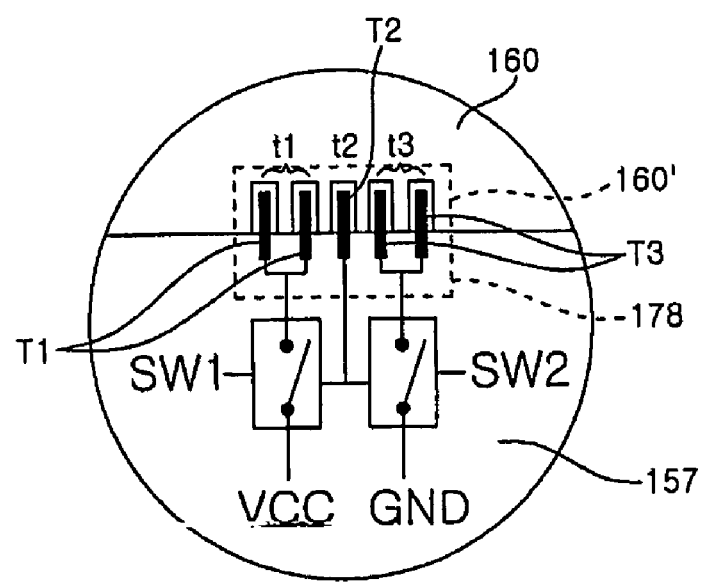
FIG. 29 is a view showing connectors of the third modification of the present invention.

According to FIGS. 28 and 29, the connector 160' installed in the communication pad 160 is provided with a plurality of terminals t1, t2 and t3. Although all five terminals t1, t2 and t3 are provided in the illustrated embodiment, it is not necessarily so, and much more terminals may be provided.

In addition, the connector 178 of the seating space 158 is provided with terminals T1, T2 and T3 corresponding to the terminals t1, t2 and t3 in number. The terminals T1 of the terminals T1, T2 and T3 are for supplying power, and the terminals T3 are for grounding. The terminals T1 and T3 are provided with switches SW1 and SW2, respectively.

The switches SW1 and SW2 are actuated depending on whether or not the communication pad 160 is mounted. One end of the switch SW1 is connected to the terminals T1, while the other end thereof is connected to a power supply VCC while an element for providing a signal. One end of the switch SW2 is connected to the terminals T3, while the other end thereof is connected to a ground GNN.

In the meantime, one end of the terminal T2 is connected to the switches SW1 and SW2. The other end of the terminal T2 is connected to the terminal t2 of the communication pad 160, and thus, serves to turn on the switches SW1 and SW2 by receiving a signal.

The operation of the third modification of the present invention constructed as above will be described.

While the communication pad 160 is seated in the seating space 158, the connectors 160' and 178 are connected to each other. Therefore, the terminals T1, T2 and T3 and the terminals t1, t2, and t3 are connected to each other.

Since the terminals T1, T2 and T3 and the terminals t1, t2 and t3 are connected to each other, the power or signal is transmitted through between the terminals T1 and t1, and the terminals T3 and t3 serve as the ground. In addition, the terminals T2 and t2 cause the switches SW1 and SW2 to be turned on, which makes it possible to transmit signals between the terminals T1 and T3 and the terminals t1 and t3.

In a state where the signal is transmitted and the ground is effected through the terminals T1, T2 and T3 and the terminals t1, t2 and t3 as described above, when the communication pad 160 is separated from the seating space 158, the electric signals are not transmitted through the terminals T1 and T3 of the connector 178. That is, if the communication pad 160 is separated from the seating space 158, the connection between the connectors 160' and 178 is released and the terminals T1, T2 and T3 and the terminals t1, t2 and t3 are also disconnected from each other.

Therefore, since the connection between the terminals T2 and t2 is released, the switches SW1 and SW2 are turned off. When the switches SW1 and SW2 are turned off, the signals are no more transmitted through the terminals T1 and T3. That is, even if the terminals T1 and T3 are electrically connected to each other, the power supply VCC or the signal cannot be transmitted.

The scope of the present invention is not limited to the embodiments described and illustrated above but is defined by the descriptions of the claims. It will be apparent that those skilled in the art can make various modifications and changes thereto within the scope of the invention described by the claims.

INDUSTRIAL APPLICABILITY

In the present invention described above in detail, the following advantages can be expected.

First, according to the present invention, the communication pad can be easily mounted to and dismounted from the door of the refrigerator main body or the home-bar door.

In addition, in the present invention, since the communication pad is mounted in the home-bar door for opening and closing the home-bar, the refrigerator can be provided with a variety of functions including the communication pad and the home-bar, thus improving user's convenience.

Particularly, in the present invention, since the refrigerator is configured so that an impact caused from the opening and closing of the home-bar door does not cause the communication pad to be removed inadvertently even while the communication pad is mounted in the home-bar door, there is an advantage in that the reliability of the product increases.

Further, in the present invention, since the communication pad may be mounted and fastened to the door using the password function, a theft or intentional dismounting of the communication pad, which is detachable from the door, can be solved.

In addition, in the present invention, since it is possible to call out the communication pad, which is detachable from the door, through the radio call signal, there is an advantage in that the communication pad at a place in which it is not in sight can be easily found.

Finally, in the present invention, the switches connected to the terminals of the connector provided in the seating space of the door are configured to be turned off when the communication pad is separated from the door. Therefore, there is an advantage in that the connector of the seating space can be prevented from damaging even when the communication pad is separated from the seating space.

The invention claimed is:

1. A refrigerator, comprising:
   a seating space including an open front face provided at one side of a door;
   a communication pad detachably seated in the seating space;
   a pair of clamps provided at upper and lower ends of the seating space, the clamps rotating pivotably in forward and backward directions and supporting the communication pad in the seating space by enclosing upper and lower ends of the communication pad; and
   a pair of hinge assemblies that fix the pair of clamps in the seating space, respectively, and cause the pair of clamps to rotate when a force of a predetermined value or higher is applied to the pair of clamps, wherein in a process of mounting and dismounting the communication pad to and from the seating space, the pair of clamps are simultaneously pivoted in opposite directions with respect to each other by the communication pad.

2. The refrigerator as claimed in claim 1, wherein front ends of the pair of clamps are provided with catching portions, respectively, that support upper and lower ends of a front surface of the communication pad, wherein portions opposite to the respective catching portions are provided with supporting portions, respectively, that support upper and lower ends of a rear surface of the communication pad, and wherein the catching portions and the supporting portions form insertion grooves in which the upper and lower ends of the communication pad are seated, respectively.

3. The refrigerator as claimed in claim 2, wherein the supporting portions of the clamps are formed to be relatively longer than the catching portions, and thus, come into contact with the rear surface of the communication pad when the communication pad is mounted and dismounted.

4. The refrigerator as claimed in claim 2, wherein the pair of hinge assemblies are configured so that respective hinge members with ends connected to the pair of clamps and the door are rotatably connected to hinge shafts, the hinge members rotating relative to the hinge shafts when the force of the predetermined value or higher is applied to the hinge members.

5. A refrigerator, comprising:
   a seating space including an open front face formed at one side of a door;
   a communication pad detachably seated in the seating space;
   at least one clamp provided at an upper end of the seating space, the at least one clamp pivoting in forward and backward directions by means of at least one hinge assembly and supporting the communication pad in the seating space by enclosing an upper end of the communication pad;
   at least one holder provided at a lower end of the seating space that supports a lower end of the communication pad by receiving the communication pad inserted thereinto; and
   at least one locking device that prevents the communication pad from being dismounted from the seating space.

6. The refrigerator as claimed in claim 5, wherein a front end of the at least one clamp and the at least one holder are provided with catching portions, respectively, that support upper and lower ends of a front surface of the communication pad, wherein portions opposite to the catching portions are each provided with a supporting portion, the supporting portions supporting upper and lower ends of a rear surface of the communication pad, respectively, and wherein the catching portions and the supporting portions form insertion grooves, in which the upper and lower ends of the communication pad are seated, respectively.

7. The refrigerator as claimed in claim 6, wherein the supporting portion of the at least one clamp is formed to be relatively longer than the catching portion of the at least one clamp, and comes into contact with the rear surface of the communication pad when the communication pad is mounted and dismounted.

8. The refrigerator as claimed in claim 6, wherein the door is a home-bar door provided in a door that opens and closes a storage space in a refrigerator main body, the home-bar door being installed so that an upper end thereof is vertically pivotable on a lower end thereof.

9. The refrigerator as claimed in claim 8, wherein the at least one locking device comprises:
   a locking bar provided at a rear surface of the at least one clamp, protruding rearward, and having a catching groove at a front end of the locking bar;
   a slot formed in the home-bar door inclined at a predetermined angle, the front end of the locking bar being selectively inserted into the slot; and
   a locking ball installed to move along the slot and prevent the at least one clamp from rotating by allowing the locking ball to move according to the rotational angle of the home-bar door and to be seated in the catching groove.

10. The refrigerator as claimed in claim 9, wherein the locking bar is inclined toward a rear portion of the home-bar door at a predetermined angle, and the slot is inclined toward a front portion of the home-bar door at a predetermined angle.

11. The refrigerator as claimed in claim 5, wherein the at least one locking device comprises:
    a housing including an installation space therein;
    a stopper including a protruding portion formed in an end of a catching portions, the catching portion being installed in the installation space and preventing the at least one clamp from operating by allowing the protruding portion to selectively protrude out of the housing and to be positioned on a rotational trace of the at least one clamp;
    an elastic member installed in the installation space of the housing that exerts an elastic force in a direction of protrusion of the protruding portion of the stopper out of the housing; and
    an operating knob installed to be exposed out of the door, connected to the stopper, and operated by a user to actuate the stopper.

12. The refrigerator as claimed in claim 11, wherein the door is a home-bar door that is provided in a door that opens and closes a storage space in a refrigerator main body, the home-bar door being installed so that an upper end thereof is vertically pivotable on a lower end thereof.

13. A refrigerator, comprising:
a seating space with an open front face formed at one side of a door;
a communication pad detachably seated in the seating space;
an upper holder provided at an upper end of the seating space that supports an upper end of the communication pad by enclosing the upper end of the communication pad; and
a lower holder provided at a lower end of the seating space that supports a lower end of the communication pad by enclosing the lower end of the communication pad, wherein at least one of the upper and lower holders is installed to be vertically movable in a height direction of the communication pad.

14. The refrigerator as claimed in claim 13, wherein the upper holder is supported by an elastic member, and wherein the elastic member exerts an elastic force in a direction of the upper end of the communication pad.

15. The refrigerator as claimed in claim 14, wherein the elastic member is provided between a ceiling of the seating space and an upper surface of the upper holder and is covered with a cover.

16. The refrigerator as claimed in claim 1, further comprising:
a fixing device that fixes the communication pad mounted in the seating space to the seating space;
a password input portion configured to receive a password to release the fixing device;
a password recognition portion that stores a previously registered password and compares the password received through the password input portion with the previously registered password; and
a release operating portion that releases the fixing device if the password recognition portion determines that the registered password and the received password are identical to each other.

17. The refrigerator as claimed in claim 16, wherein the fixing device comprises a solenoid with a plunger capable of moving inward and outward.

18. The refrigerator as claimed in claim 16, wherein the fixing device comprises a magnet switch that selectively generates a magnetic force by switching power on or off.

19. The refrigerator as claimed in claim 1, further comprising:
a radio call signal generator provided in a main body side including the door that generates a radio call signal in response to a user's input;
a radio call signal receiver provided in the communication pad that receives the radio call signal;
a ring tone generator provided in the communication pad that generates a ring tone when the radio call signal is received in the radio call signal receiver; and
a speaker provided in the communication pad that outputs the ring tone generated in the ring tone generator.

20. The refrigerator as claimed in claim 1, further comprising a connector installed in the seating space to be exposed and including a plurality of terminals, wherein all of the plurality of terminals except one are provided with a switch, and the switch is turned on by allowing a connector provided in the communication pad to be inserted in the connector installed in the seating space, thereby effecting an electrical connection between the door and the communication pad.

21. The refrigerator as claimed in claim 20, wherein the terminal without the switch includes an end connected to a switch and another end selectively connected to one of the plurality of terminals of the connector provided in the communication pad.

* * * * *